US012764236B2

(12) United States Patent
Satomi

(10) Patent No.: US 12,764,236 B2
(45) Date of Patent: Oct. 13, 2026

(54) ECHO SUPPRESSING DEVICE, ECHO SUPPRESSING METHOD, AND ECHO SUPPRESSING PROGRAM

(71) Applicant: TRANSTRON INC., Yokohama (JP)

(72) Inventor: Yuki Satomi, Yokohama (JP)

(73) Assignee: TRANSTRON INC., Yokohama (JP)

( * ) Notice: Subject to any disclaimer, the term of this patent is extended or adjusted under 35 U.S.C. 154(b) by 419 days.

(21) Appl. No.: 18/283,677

(22) PCT Filed: Feb. 18, 2022

(86) PCT No.: PCT/JP2022/006655
§ 371 (c)(1),
(2) Date: Sep. 22, 2023

(87) PCT Pub. No.: WO2022/202012
PCT Pub. Date: Sep. 29, 2022

(65) Prior Publication Data

US 2024/0171685 A1 May 23, 2024

(30) Foreign Application Priority Data

Mar. 26, 2021 (JP) ................................ 2021-054402

(51) Int. Cl.
*H04M 9/08* (2006.01)
*G10L 21/0208* (2013.01)
*H04B 3/23* (2006.01)

(52) U.S. Cl.
CPC ......... *H04M 9/082* (2013.01); *G10L 21/0208* (2013.01); *H04B 3/234* (2013.01); *G10L 2021/02082* (2013.01)

(58) Field of Classification Search
CPC . H04M 9/082; H04M 1/6008; G10L 21/0208; G10L 2021/02082; G10L 25/78; H04B 3/234
See application file for complete search history.

(56) References Cited

U.S. PATENT DOCUMENTS 6,445,792 B1 9/2002 Shiraki et al.
8,811,623 B2 * 8/2014 Sudo .................. G10L 21/0208 381/318

(Continued)

FOREIGN PATENT DOCUMENTS

EP 0803990 A2 10/1997
EP 0803990 A3 2/2002

(Continued)

OTHER PUBLICATIONS

European Patent Office, "Extended European Search Report for European Application No. 22774812.6," Jul. 2, 2024, 7 pp.

(Continued)

*Primary Examiner* — Lisa Hashem
(74) *Attorney, Agent, or Firm* — HAUPTMAN HAM, LLP

(57) ABSTRACT

It is possible to accurately estimate the echo suppression amount for each frequency even when a nonlinear echo component is large. An estimated echo function having variables of a logarithm of a magnitude at each frequency of a reception signal, a frequency of the reception signal, a logarithm of a total reception value that is a summation of magnitudes of the reception signal or transmission of the reception signal in any frequency range, and a logarithm of an envelope of the total reception value is stored. An echo suppressing process is performed by inputting a value of a second reception signal (a result of converting the reception signal into a frequency domain) to a function representing an estimated echo to generate an echo suppressing mask, and multiplying an echo suppressing gain calculated based on this echo suppressing mask by a second transmission signal (transmission signal converted into a frequency domain).

11 Claims, 12 Drawing Sheets

(56) References Cited

U.S. PATENT DOCUMENTS

| | | | | |
|---|---|---|---|---|
| 11,039,245 | B2 * | 6/2021 | Satomi | G10L 21/0232 |
| 11,245,983 | B2 * | 2/2022 | Tateishi | H04R 1/021 |
| 11,924,367 | B1 * | 3/2024 | Valin | G10L 25/18 |
| 11,990,149 | B2 * | 5/2024 | Satomi | G10L 21/0208 |
| 12,231,603 | B2 * | 2/2025 | Wang | H04M 9/082 |
| 12,406,683 | B2 * | 9/2025 | Yu | G10L 21/0208 |
| 12,469,512 | B2 * | 11/2025 | Satomi | G10L 25/21 |
| 2007/0041576 | A1 | 2/2007 | Kawaguchi et al. | |
| 2009/0103743 | A1 * | 4/2009 | Honda | H04B 3/234 381/66 |
| 2014/0177859 | A1 | 6/2014 | Ahgren | |
| 2015/0011266 | A1 * | 1/2015 | Feldt | H04M 9/082 455/570 |
| 2018/0331719 | A1 * | 11/2018 | Awano | H04M 1/60 |
| 2021/0099797 | A1 | 4/2021 | Satomi | |
| 2021/0144474 | A1 | 5/2021 | Satomi | |
| 2021/0211546 | A1 | 7/2021 | Satomi | |
| 2025/0193315 | A1 * | 6/2025 | Furukawa | H04M 9/082 |

FOREIGN PATENT DOCUMENTS

| | | | | |
|---|---|---|---|---|
| EP | 3633865 | A1 * | 4/2020 | H04M 1/6016 |
| JP | 2007-053512 | A | 3/2007 | |
| JP | 2009-094802 | A | 4/2009 | |
| JP | 2016-503263 | A | 2/2016 | |
| JP | 6180689 | B2 | 8/2017 | |
| WO | 2019/220951 | A1 | 11/2019 | |
| WO | WO-2019239977 | A1 * | 12/2019 | H04M 9/082 |

OTHER PUBLICATIONS

Japan Patent Office, Notice of Reasons for Refusal for Japanese Patent Application No. 2021-054402 mailed on Jan. 7, 2025; 3 pp.
PCT/ISA/210, “International Search Report for PCT International Application No. PCT/JP2022/006655,” May 17, 2022.

* cited by examiner

ECHO SUPPRESSING DEVICE, ECHO SUPPRESSING METHOD, AND ECHO SUPPRESSING PROGRAM

RELATED APPLICATIONS

The present application is National Phase of International Application No. PCT/JP2022/006655 filed Feb. 18, 2022, and claims priority from Japanese Application No. 2021-054402, filed Mar. 26, 2021, the disclosure of which is hereby incorporated by reference herein in its entirety.

TECHNICAL FIELD

The present invention relates to an echo suppressing device, an echo suppressing method, and an echo suppressing program.

BACKGROUND ART

Patent Literature 1 discloses an echo canceller device used in a voice communication system including a microphone and a speaker. This echo canceller device has an echo erasure unit for removing an artificial echo component from a microphone input signal and outputting a residual signal, a pERL (pseudo Echo Return Loss) calculation unit for calculating a pERL value that indicates the ratio of the microphone input signal to the residual signal; an ERLE (Echo Return Loss Enhancement) calculation unit for calculating an ERLE value that indicates the ratio of an echo signal based on an echo input from a speaker to a microphone out of the microphone input signal to a residual echo signal obtained by subtracting the artificial echo component from the echo signal, a pERL reduction degree calculation unit for calculating a reduction degree that indicates a difference between the ERLE value and the pERL value, a suppression amount calculation unit for calculating a residual echo suppression amount from an equation $(K-1)T/K(T-1)$ where a value of the reduction degree indicated by a linear value is K and a value of the ERLE value indicated by a linear value is T, and a residual echo suppressing processing unit for generating an output signal by multiplying the residual signal by the residual echo suppression amount.

CITATION LIST

Patent Literature

Patent Literature 1: Japanese Patent No. 6180689

SUMMARY OF INVENTION

Technical Problem

In general, in a case where a nonlinear echo component generated by reflection, vibration or a speaker, or the like is large, estimation of an echo suppression amount often does not function properly. The echo canceller device described in Patent Literature 1 has a risk that an echo suppression amount cannot be accurately estimated in a frame in which a reflection time is long and there is no signal in reception.

The present invention has been made in view of such circumstances, and an object is to provide an echo suppressing device, an echo suppressing method, and an echo suppressing program that can accurately estimate an echo suppression amount for each frequency even when a nonlinear echo component is large.

Solution to Problem

In order to solve the above problems, an echo suppressing device according to the present invention is, for example, an echo suppressing device that suppresses an echo caused when a reception signal transmitted through a receiving signal path through which a signal is transmitted to a speaker and voice output from the speaker by the reception signal is input to a microphone, the echo suppressing device including: a storage unit that stores an estimated echo calculated based on a second learning reception signal in which a learning reception signal transmitted through the receiving signal path is converted into a frequency domain and a second learning signal in which a learning signal transmitted through a transmitting signal path for transmitting a signal input from the microphone when voice output from the speaker by the learning reception signal input to the microphone is converted into a frequency domain, an estimated echo function having variables of a logarithm of a magnitude at each frequency of the reception signal, a frequency of the reception signal, a logarithm of a total reception value that is a summation of magnitudes of the reception signal or transmission of the reception signal in any frequency range, and a logarithm of an envelope of the total reception value; and a nonlinear echo suppressing unit that performs an echo suppressing process by inputting a value of a second reception signal in which the reception signal is converted into a frequency domain to a function representing the estimated echo to generate an echo suppressing mask, and multiplying an echo suppressing gain calculated based on the echo suppressing mask by a second transmission signal in which a transmission signal transmitted through the transmitting signal path converted into a frequency domain.

According to the echo suppressing device according to the present invention, an estimated echo function having variables of a logarithm of a magnitude at each frequency of a reception signal, a frequency of the reception signal, a logarithm of a total reception value that is a summation of magnitudes of the reception signal, and a logarithm of an envelope of the total reception value, and an echo suppressing process is performed by inputting a value of a second reception signal (a result of converting a reception signal into a frequency domain) to a function representing this estimated echo to generate an echo suppressing mask, and multiplying an echo suppressing gain calculated based on this echo suppressing mask by a second transmission signal (a result of converting a transmission signal into a frequency domain). This makes it possible to accurately estimate an echo suppression amount for each frequency even when a nonlinear echo component is large. As a result, the call quality can be improved.

A double-talk detection unit that inputs a value of the second reception signal to a function representing the estimated echo to generate a double-talk detection mask and sequentially detects whether or not speech has been input to the microphone based on the second transmission signal and the double-talk detection mask may be included, and the nonlinear echo suppressing unit may make the echo suppressing gain smaller in a case where speech is input to the microphone than that in a case where speech has not been input to the microphone. This can weaken, when there is near-end speech and a far-end speaker is considered to hardly feel uncomfortable about an echo, suppression of the echo, and can prevent the sound from becoming unnatural due to excessive suppression of the echo.

By comparing; the magnitude of the second transmission signal with the magnitude of the double-talk detection mask for each frequency, the double-talk detection unit may detect that no speech has been input to the microphone based on whether or not the number of frequencies at which the magnitude of the second transmission signal exceeds the magnitude of the double-talk detection mask is less than a first threshold, whether or not a summation of magnitudes of the second transmission signal in a frequency band at which the magnitude of the second transmission signal exceeds the magnitude of the double-talk detection mask is less than a second threshold, or whether or not a summation of differences between the magnitude of the second transmission signal and the magnitude of the double-talk detection mask in a frequency band at which the magnitude of the second transmission signal exceeds the magnitude of the double-talk detection mask is less than a third threshold. This can accurately detect the presence or absence of near-end speech.

A noise estimation unit that estimates a noise component included in the second transmission signal, and a noise suppressing unit that suppresses a noise signal from an echo removal signal by multiplying the second transmission signal by a noise suppressing gain are included, and the nonlinear echo suppressing unit may obtain the echo suppressing mask based on the estimated echo, the noise component, and the noise suppressing gain. This can perform appropriate echo suppression without being affected by noise.

A noise estimation unit that estimates a noise component included in the second transmission signal, and a noise suppressing unit that suppresses a noise signal from an echo removal signal by multiplying the second transmission signal by a noise suppressing gain are included, and the double-talk detection unit may obtain the double-talk detection mask based on the estimated echo, the noise component, and the noise suppressing gain. This can prevent erroneous detection due to an influence of noise.

The nonlinear echo suppressing unit may obtain an allowable value indicating the magnitude of an allowable residual echo based on the noise component and the noise suppressing gain, and multiplies the second transmission signal by the echo suppressing gain that reduces the magnitude of the echo suppressing mask to the magnitude of the allowable value. This can prevent echo from being suppressed more than necessary.

The nonlinear echo suppressing unit may obtain the echo suppressing gain based on a value obtained by subtracting the allowable value from the magnitude of the second transmission signal when the magnitude of the second transmission signal is greater than the allowable value and is equal to or less than the echo suppressing mask, and obtains the echo suppressing gain based on a value obtained by subtracting the allowable value from the echo suppressing mask when a value of the second transmission signal is greater than the allowable value and the echo suppressing mask. This can appropriately suppress the echo according to the magnitude of the second transmission signal.

In a function representing the estimated echo, a coefficient of each variable may be obtained based on data where an outlier is excluded from the second learning signal. This can prevent the magnitude of the echo suppressing mask from becoming larger than necessary, and can prevent the echo from being excessively suppressed. The magnitude of the double-talk detection mask can be prevented from becoming larger than necessary, and the presence or absence of near-end speech can be accurately detected.

The function representing the estimated echo may include a first function in which a coefficient of each variable is obtained based on data in which an outlier is excluded from the second learning signal, and a second function in which a coefficient of each variable is obtained based on the second learning signal in which outlier is not excluded, the double-talk detection mask may be obtained based on the first function, and the echo suppressing mask may be obtained based on the second function. This can perform sufficient echo suppression by enhancing suppression of nonlinear echo while accurately detecting the presence or absence of near-end speech.

In order to solve the above problems, an echo suppressing method according to the present invention is, for example, an echo suppressing method for suppressing an echo caused when a reception signal is transmitted through a receiving signal path through which a signal is transmitted to a speaker and voice output from the speaker by the reception signal is input to a microphone, the echo suppressing method including: a step of acquiring an estimated echo calculated based on a second learning reception signal in which a learning reception signal transmitted through the receiving signal path is converted into a frequency domain and a second learning signal in which a learning signal transmitted through a transmitting signal path for transmitting a signal input from the microphone when voice output from the speaker by the learning reception signal is input to the microphone is converted into a frequency domain, the estimated echo stored in a storage unit, an estimated echo function having variables of a logarithm of a magnitude at each frequency of the reception signal, a frequency of the reception signal, a logarithm of a total reception value that is a summation of magnitudes of the reception signal or transmission of the reception signal in any frequency range, and a logarithm of an envelope of the total reception value; and a step of performing an echo suppressing process by inputting a value of a second reception signal in which the reception signal is converted into a frequency domain to a function representing the estimated echo to generate an echo suppressing mask, and multiplying an echo suppressing gain calculated based on the echo suppressing mask by a second transmission signal in which a transmission signal transmitted through the transmitting signal path converted into a frequency domain.

In order to solve the above problems, an echo suppressing program according to the present invention is, for example, an echo suppressing program for suppressing an echo caused when a reception signal is transmitted through a receiving signal path through which a signal is transmitted to a speaker and voice output from the speaker by the reception signal is input to a microphone, the echo suppressing program causing a computer to function as a storage unit that stores an estimated echo calculated based on a second learning reception signal in which a learning reception signal transmitted through the receiving signal path is converted into a frequency domain and a second learning signal in which a learning signal transmitted through a transmitting signal path for transmitting a signal input from the microphone when voice output from the speaker by the learning reception signal is input to the microphone is converted into a frequency domain, an estimated echo function having variables of a logarithm of a magnitude at each frequency of the reception signal, a frequency of the reception signal, a logarithm of a total reception value that is a summation of magnitudes of the reception signal, and a logarithm of an envelope of the total reception value; and a nonlinear echo suppressing unit that performs an echo suppressing process by inputting a value of a second reception signal in which the reception signal is converted into a frequency domain to a junction representing the estimated echo to generate an echo suppressing mask, and multiplying an echo suppressing gain calculated based on the echo suppressing mask by a second transmission signal in which a transmission signal transmitted through the transmitting signal path converted into a frequency domain.

Note that the computer program can be provided by being downloaded via a network such as the Internet, or can be provided by being recorded in various computer-readable recording media such as a CD-ROM.

Advantageous Effects of Invention

According to the present invention, it is possible to accurately estimate an echo suppression amount for each frequency even when a nonlinear echo component is large.

BRIEF DESCRIPTION OF DRAWINGS

FIG. 4(A) is a scatter diagram of the logarithm of a power spectrum at each frequency of the learning reception signal and the logarithm of a power spectrum at each frequency of the learning signal, FIG. 4(B) is a scatter diagram of the frequency of the learning reception signal and the logarithm of the power spectrum at each frequency of the learning signal, FIG. 4(C) is a scatter diagram of the logarithm of a total reception power spectrum of the learning reception signal and the logarithm of the power spectrum at each frequency of the learning signal, and FIG. 4(D) is a scatter diagram of the logarithm of an envelope of the total reception power spectrum and the logarithm of the power spectrum at each frequency of the learning signal.

DESCRIPTION OF EMBODIMENTS

Embodiments of an echo suppressing device according to the present invention will be described below in detail with reference to the drawings. The echo suppressing device is a device that suppresses an echo caused by a voice signal output from a speaker being input to a microphone in a voice communication system.

First Embodiment

Figure 1:
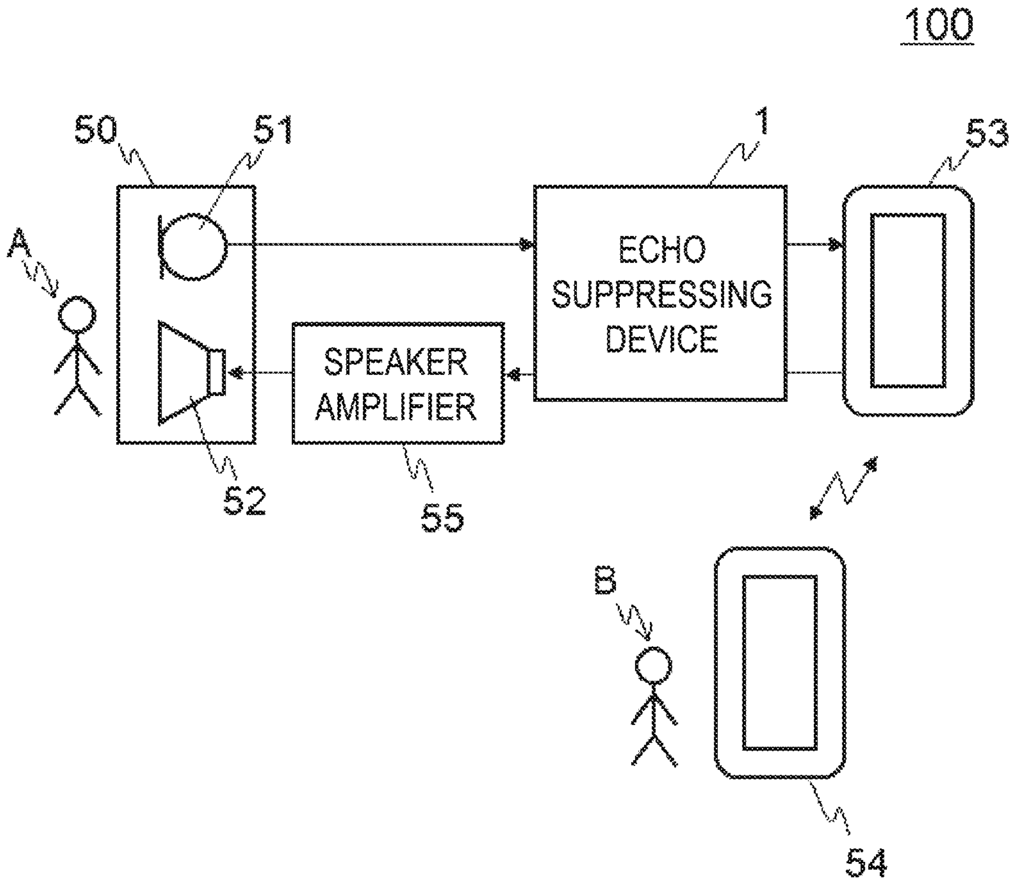
FIG. 1 is a diagram schematically illustrating a voice communication system 100 provided with an echo suppressing device 1 according to a first embodiment.

FIG. 1 is a diagram schematically illustrating a voice communication system 100 provided with an echo suppressing device 1 according to the first embodiment. The voice communication system 100 mainly includes a terminal 50 including a microphone 51 and a speaker 52, two cell phones 53 and 54, a speaker amplifier 55, and the echo suppressing device 1.

The voice communication system 100 is a system in which a near-end speaker (user A on a near-end side) utilizing the terminal 50 (near-end terminal) is in voice communication with a far-end speaker (user B on a far-end side) utilizing the cell phone 54 (far-end terminal). A voice signal input via the cell phone 54 is amplified and output by the speaker 52, and a voice uttered by the user A on the near-end side is collected by the microphone 51 and transmitted to the cell phone 54, whereby the user A can make a loudspeaker call (hands-free call) without holding the cell phone 53. The cell phone 53 and the cell phone 54 are connected together by a common telephone line.

The echo suppressing device 1 may be configured as a dedicated board mounted on a speech terminal or the like (for example, an on-board device, a conference system, or a mobile terminal) in the voice communication system 100. Additionally, the echo suppressing device 1 may include, for example, mainly a computer system including an arithmetic device, such as a Central Processing Unit (CPU), for performing information processing, and a storage device, such as a Random Access Memory (RAM) and a Read Only Memory (ROM), and software (echo suppressing program). The echo suppressing program may be stored in advance in an SSD (Solid State Drive) as a storage medium built in equipment such as a computer, a ROM in a microcomputer having a CPU, or the like, and installed in the computer from there. Additionally, the echo suppressing program may be temporarily or permanently stored (memorized) in a removable storage medium such as a semiconductor memory, a memory card, an optical disc, a magneto-optical disk, a magnetic disk, or the like.

Figure 2:
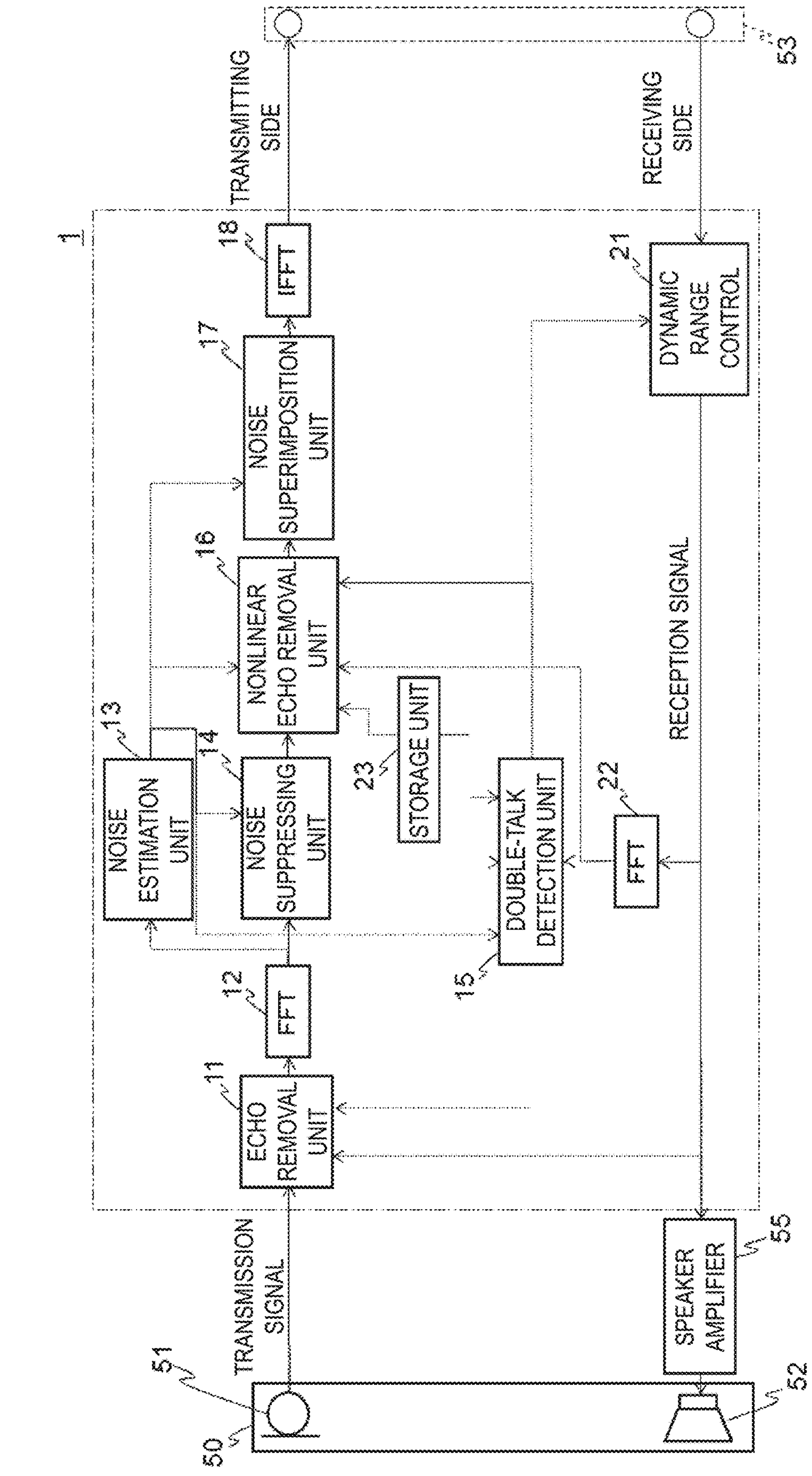
FIG. 2 is a diagram illustrating an overview of a function block of the echo suppressing device 1.

FIG. 2 is a diagram illustrating an overview of a function block of the echo suppressing device 1. The echo suppressing device 1 functionally mainly includes an echo removal unit 11, frequency analyzers (FFT units) 12 and 22, a noise estimation unit 13, a noise suppressing unit 14, a double-talk detection unit 15, a nonlinear echo suppressing unit 16, a noise superimposition unit 17, a restoration unit (IFFT unit) 18, a dynamic range control 21, and a storage unit 23. In FIG. 2, an upper signal path is a transmitting signal path through which input signals input from the microphone 51 are transmitted, and a lower signal path is a receiving signal path through which signals are transmitted to the speaker 52. Note that the functional components of the echo suppressing device 1 may be classified into more components according to the processing content, or one component may perform processing of a plurality of components.

The echo removal unit 11, for example, uses an adaptive filter to remove an echo. The echo removal unit 11 updates a filter coefficient according to a given procedure to generate a pseudo echo signal from a signal transmitted through the receiving signal path, and subtracts the pseudo echo signal from a signal transmitted through the transmitting signal path to remove the echo. Note that adaptive filters are well known, and thus description of the adaptive filter is omitted.

Note that in the present embodiment, an adaptive filter is applied to the echo removal unit 11 but any other known echo removal technique can be applied to the echo removal unit 11. Although the echo removal unit 11 is not essential, the echo removal unit 11 is desirably provided because by generating a mask using a learning signal from which a part of echo has been removed, it is possible to more accurately detect the presence of near-end speech (speech of the user A (see FIG. 1)).

In a case where the double-talk detection unit 15 (described in detail later) detects a presence of near-end speech, the dynamic range control 21 performs amplification (i.e., compression) for a reception signal greater than a threshold among input reception signals with a predetermined coefficient (the coefficient is a value less than 1), and performs output. Note that the dynamic range control 21 may include a gain adjustment unit that automatically changes the gain depending on noise or the like in the environment where the terminal 50 is mounted, or automatically changes the gain according to the magnitude of the reception signal.

The frequency analyzers (FFT units) 12 and 22 perform a fast Fourier transform (FFT) on a signal. The FFT unit 12 performs fast Fourier transform on a signal transmitted on the transmitting signal path, here, a signal passing through the echo removal unit 11, and the FFT unit 22 performs fast Fourier transform on a signal transmitted on the receiving signal path. The FFT units 12 and 22 convert signals (time domain) arranged in time series into signals (frequency domain) expressed by a set of frequencies. Hereinafter, a time-dependent signal is indicated by . . . [t], and a frequency-dependent signal is indicated by . . . [i].

The noise estimation unit 13 estimates, for each frequency, a noise component included iii the echo removal signal [i] for which an echo has been removed by the echo removal unit 11 from the transmission signal input from the microphone 51 and transmitted through the transmitting signal path and has converted into the frequency domain by the FFT unit 12, that is, a power spectrum [i] (hereinafter, called estimated noise power spectrum [i]) of the estimated noise signal. The estimated noise power spectrum [i] is output to the noise suppressing unit 14, the double-talk detection unit 15, the nonlinear echo suppressing unit 16, and the noise superimposition unit 17.

The noise suppressing unit 14 multiplies the estimated noise power spectrum [i] by a noise suppressing gain (hereinafter, called a noise suppressing gain [i]) that is a frequency-dependent signal to suppress the noise signal from the echo removal signal [i], and generates a suppressed signal [i]. Using a known noise suppressing method such as spectral subtraction or the Wiener filter, the noise suppressing unit 14 suppresses a noise signal, and the noise suppressing gain [i] is calculated by the noise suppressing unit 14 according to the noise suppressing method to be used. The calculated noise suppressing gain [i] is output to the double-talk detection unit 15. Note that the noise estimation unit 13 and the noise suppressing unit 14 are not essential.

Figure 3:
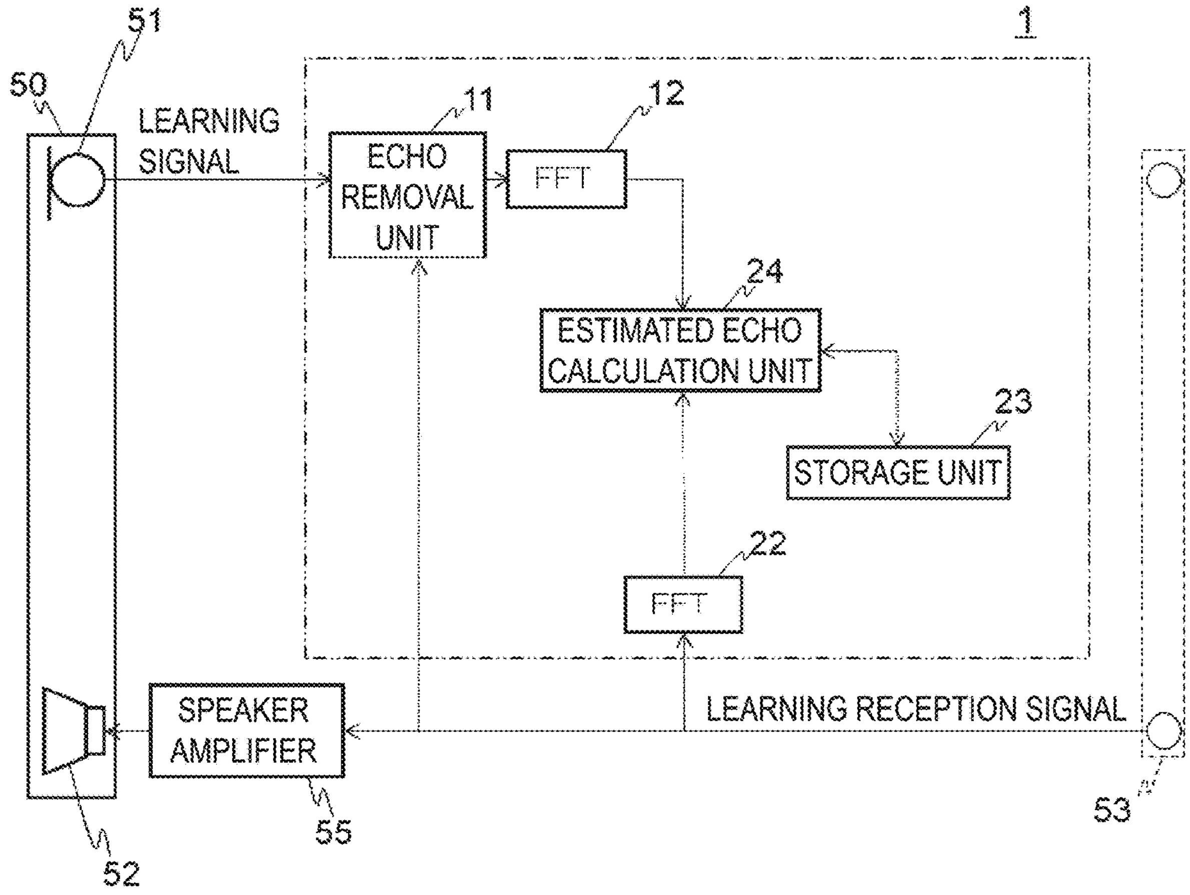
FIG. 3 is a diagram illustrating an overview of a function block of the echo suppressing device 1 when obtaining a function for calculating an estimated echo.

The storage unit 23 stores the mask generated by an estimated echo calculation unit 24 (see FIG. 3). The generation of the mask will be described in detail below. The mask is generated in advance before the echo suppressing device 1 performs the process of suppressing an echo.

FIG. 3 is a diagram illustrating an overview of the function block of the echo suppressing device 1 when obtaining a function for calculating an estimated echo. The echo suppressing device 1 functionally includes the estimated echo calculation unit 24. The calculation process of the estimated echo is mainly performed by the estimated echo calculation unit 24.

The calculation process of the estimated echo will be described in detail. First, after the echo removal unit 11 has sufficiently finished learning of the adaptive filter, in a situation where there is no near-end speech and background noise is sufficiently small, a learning reception signal is transmitted through the receiving signal path, and one-side speech (single-talk) on the far-end side that causes the speaker 52 to output a sound by the learning reception signal is repeated. A signal transmitted through the transmitting signal path during the single-talk is used as a learning signal. In the echo suppressing device 1, the learning signal corresponds to a signal in which the echo has been removed by the echo removal unit 11.

The learning signal (hereinafter, called a learning signal [t]) that is a time-dependent signal is input to the FFT unit 12. The FFT unit 12 performs the fast Fourier transform on the learning signal [t] to generate a learning signal (hereinafter, called a learning signal [i]) that is a frequency-dependent signal, and inputs the learning signal to the estimated echo calculation unit 24.

The learning reception signal (hereinafter, called a learning reception signal [t]) that is a time-dependent signal is input to the FFT unit 22. The FFT unit 22 performs the fast Fourier transform on the learning reception signal [t] to generate a learning reception signal (hereinafter, called a learning reception signal [i]) that is a frequency-dependent signal, and inputs the learning reception signal to the estimated echo calculation unit 24.

The estimated echo calculation unit 24 stores the learning signal [i] and the learning reception signal [i] into the storage unit 23. The estimated echo calculation unit 24 calculates, for each certain section, power spectra for the learning signal [i] and the learning reception signal [i] stored in the storage unit 23 to obtain a plurality of learning power spectra. Here, the certain section is an arbitrarily determined predetermined time region. The estimated echo calculation unit 24 stores the learning power spectra into the storage unit 23.

Note that the power spectrum P[i] is expressed by the square of a Fourier spectrum X[i] obtained by the fast Fourier transform (see Equation (1)).

$$P[i]=|X[i]|^2=|X[i]|\times|X[i]| \quad (1)$$

The estimated echo calculation unit 24 creates a plurality of scatter diagrams of the learning signal [i] and the learning reception signal [i] based on the learning signal [i], the learning reception signal [i], and the learning power spectra stored in the storage unit 23.

Figure 4A:
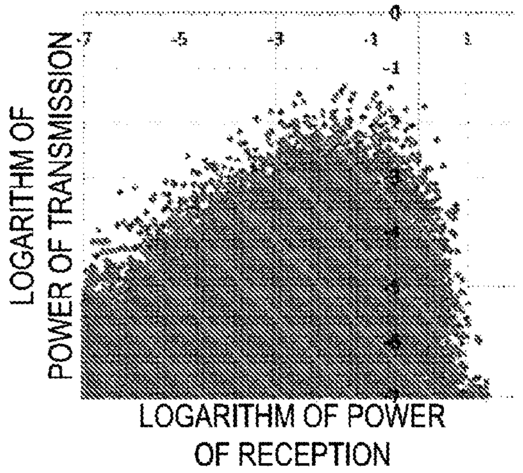
FIGS. 4(A)-4(D) are examples of a scatter diagram of a learning signal [i] with respect to a learning reception signal [i] at a certain time, where
Figure 4B:
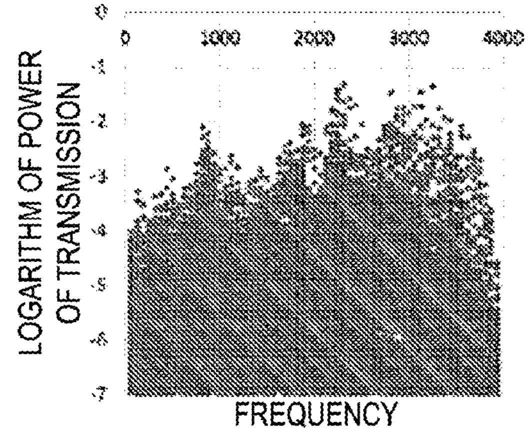
Figure 4C:
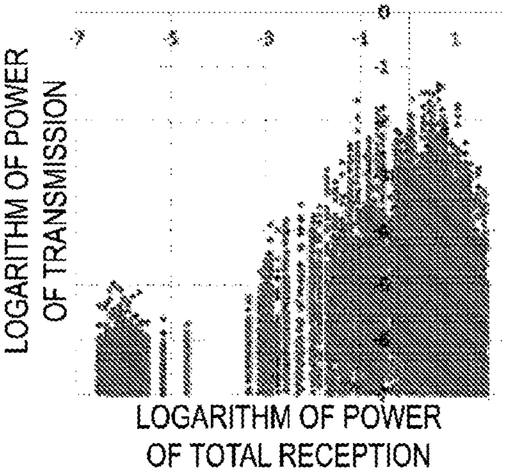
Figure 4D:
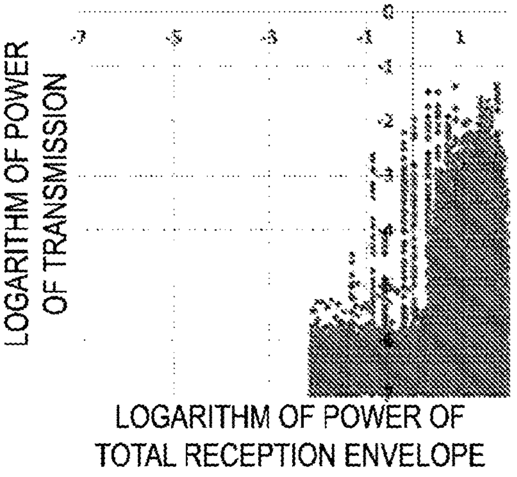

FIGS. 4(A)-(D) are examples of a scatter diagram of the learning signal [i] with respect to the learning reception signal [i] at a certain time (e.g., time t1), where FIG. 4(A) is a scatter diagram of the logarithm of the magnitude of the learning reception signal (power spectrum of a learning reception signal [t]) at each frequency and the logarithm of the power spectrum at each frequency of the learning signal, FIG. 4(B) is a scatter diagram of the frequency of the learning reception signal and the logarithm of the power spectrum at each frequency of the learning signal, FIG. 4(C) is a scatter diagram of the logarithm of the total reception power spectrum (equivalent to the total reception value of the present invention) that is a summation of the magnitudes of the learning reception signal and the logarithm of the power spectrum at each frequency of the learning signal, and FIG. 4(D) is a scatter diagram of the logarithm of an envelope of the total reception power spectrum and the logarithm of the power spectrum at each frequency of the learning signal.

For example, as illustrated in FIGS. 4(A) and 4(C), even if the power spectra of the learning signals are the same, the learning signals, that is, the power spectra of echoes vary. Therefore, in the present embodiment, the estimated echo is calculated based on not only the power spectrum of the learning signal but also a plurality of scatter diagrams with the horizontal axes varied.

Here, the power spectrum at each frequency of the learning signal means a power spectrum of an echo by the learning reception signal. The total reception power spectrum is the same as the summation of the power spectra at each frequency of the learning signal, that is, the summation of the power spectra of the learning reception signal [t] before passing through the FFT unit 22, and is expressed by the following Equation (2).

$$\text{TOTAL RECEPTION POWER SPECTRUM} = \sum_{i=0}^{F\_MAX} \text{RECEPTION POWER SPECTRUM } [i] \quad (2)$$

Note that the total reception power spectrum may be a summation of power spectra at each frequency in any frequency range of the learning signal. The total reception power spectrum at this time is expressed by the following Equation (3). Here, A is 0 or more, and B is less than the maximum frequency (A>0, B<F_MAX).

$$\text{TOTAL RECEPTION POWER SPECTRUM} = \sum_{i=A}^{B} \text{RECEPTION POWER SPECTRUM } [i] \quad (3)$$

When the double-talk detection unit 15 performs speech detection (described in detail later), there can be a case where accuracy is better in the case of using the summation of the power spectra (Equation (3)) in any frequency range of the learning signal than that in the case of using the summation (Equation (2)) of the power spectra of all the frequencies of the learning signal. Therefore, in such a case, the estimated echo calculation unit 24 desirably obtains the total reception power spectrum using Equation (3).

Note that the scatter diagrams illustrated in FIGS. 4(A)-(D) are examples, and the scatter diagrams vary depending on the situation of reflection of sound, the arrangement of the speaker 52 and the microphone 51, the shape of the speaker 52, the presence or absence of the echo removal unit 11, and the like.

As illustrated in FIGS. 4(A)-4(D), a certain relationship is established between information on the logarithm and frequency of the learning reception signal and the power spectrum of the learning signal, that is, the echo. In the present embodiment, the learning signal [i] and the learning reception signal [i] are sufficiently acquired in advance, and an estimated echo amount is obtained based on the certain relationship between them.

Specifically, the estimated echo calculation unit 24 calculates the estimated echo function by using the following Equation (4). The estimated echo function (estimated echo power spectrum [i]) is a frequency-dependent signal, and is expressed by a function having, as variables, the logarithm of the magnitude at each frequency of the learning reception signal, the frequency of the learning reception signal, the logarithm of the total reception power spectrum of the learning reception signal, and the logarithm of the envelope of the total reception value of the learning reception signal.

$$\text{Estimated echo power spectrum } [i] = \alpha \times \text{reception power spectrum } [i] + \beta \times \text{frequency} + \gamma \times \text{total reception power spectrum} + \delta \times \text{envelope of total reception power spectrum} \quad (4)$$

Calculation of the estimated echo function will be described in detail with reference to FIGS. 5 to 8. The estimated echo calculation unit 24 sequentially calculates the coefficient α of the reception power spectrum [i], the coefficient β of the frequency, the coefficient γ of the total reception power spectrum, and the coefficient δ of the envelope of the total reception power spectrum. The coefficients α, β, γ, and δ of the respective variables are each obtained based on data in which outliers are excluded from the learning signal [i].

Figure 5:
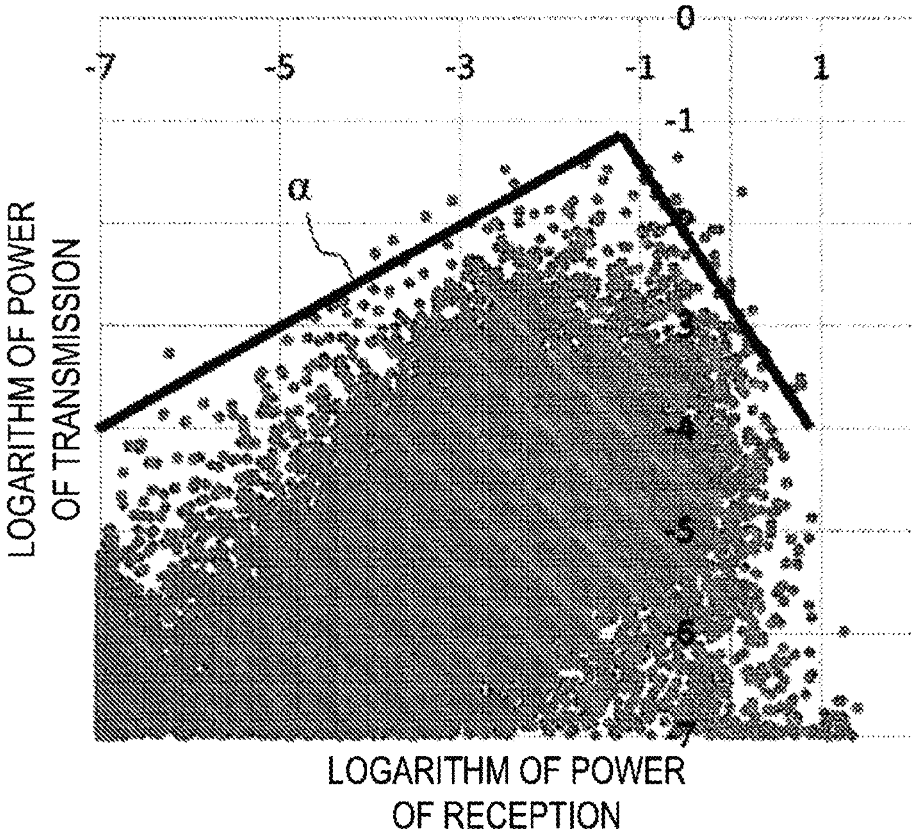
FIG. 5 is a scatter diagram of the logarithm of a power spectrum of reception and the logarithm of a power spectrum of transmission.

FIG. 5 is a scatter diagram of the logarithm of the power spectrum at each frequency of the learning reception signal (hereinafter, called a power spectrum of reception) and the logarithm of the power spectrum at each frequency of the learning signal (hereinafter, called a power spectrum of transmission). In FIG. 5, measured data are plotted, and α is indicated by a line.

a indicates the relationship between the logarithm of the power spectrum of reception and the maximum value of the logarithm of the power spectrum of transmission. α is obtained based on a result of removing outliers from a scatter diagram of the logarithm of the power spectrum of reception and the logarithm of the power spectrum of transmission. α is expressed by a linear function (without conditional branching) or a nonlinear function (with conditional branching).

As illustrated in-FIG. 5, a large power spectrum of reception does not necessarily mean that the power spectrum of transmission (i.e., echo) increases. Rather, the echo decreases when the power spectrum of reception becomes greater than a certain degree. This is because of the characteristics of the speaker 52 (there is a region where sound cannot be emitted) or the echo removal unit 11 preceding the FFT unit 12. In the example illustrated in FIG. 5, a is indicated by Equation (5) and Equation (6). Thus, α is a nonlinear function.

When the logarithm of the power spectrum of reception<−1

$$\alpha = 0.5 \times \text{logarithm of power spectrum of reception} - 0.5 \quad (5)$$

When the logarithm of the power spectrum of reception>−1

$$\alpha = -1.0 \times \text{logarithm of power spectrum of reception} - 2.0 \quad (6)$$

Note that in a case where the echo removal unit 11 is not provided, as compared with the example illustrated in FIG. 5, the peak of the line indicating a is shifted to the right side, and the slope of the falling line after the peak becomes small, but there is no change in that α is a nonlinear function (with conditional branching).

Figure 6:
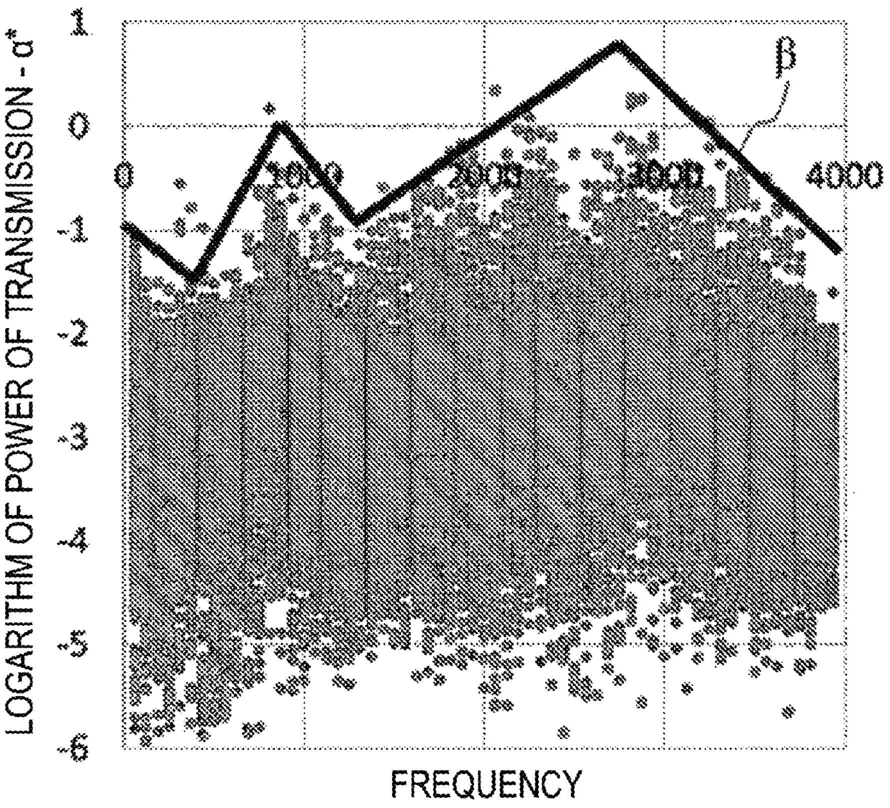
FIG. 6 is a scatter diagram of the logarithm of the frequency of reception and the logarithm of the power spectrum of transmission.

After calculating α, the estimated echo calculation unit 24 calculates β. FIG. 6 is a scatter diagram of the logarithm of the frequency of a learning reception signal (hereinafter, called a frequency of reception) and the logarithm of the power spectrum of transmission. In FIG. 6, the result obtained by subtracting the α component from the measured data is plotted, and R is indicated by a line.

β indicates the relationship between the frequency of reception and the maximum value of the logarithm of the power spectrum of transmission. β is obtained based on a result of removing outliers from a scatter diagram of the frequency of reception and the logarithm of the power spectrum of transmission. β is expressed by a linear function or a nonlinear function.

Since the speaker 52 has a characteristic that it is difficult to emit low-frequency waves and high-frequency waves, the echo is small for low-frequency waves and high-frequency waves in FIG. 6. In a case where the terminal 50 is provided in a vehicle, as illustrated in FIG. 6, a dip in which an echo decreases due to the influence of an intermediate environment (reflection or the like) exists in the Vicinity of 1 kHz. Therefore, β is a nonlinear function.

Figure 7:
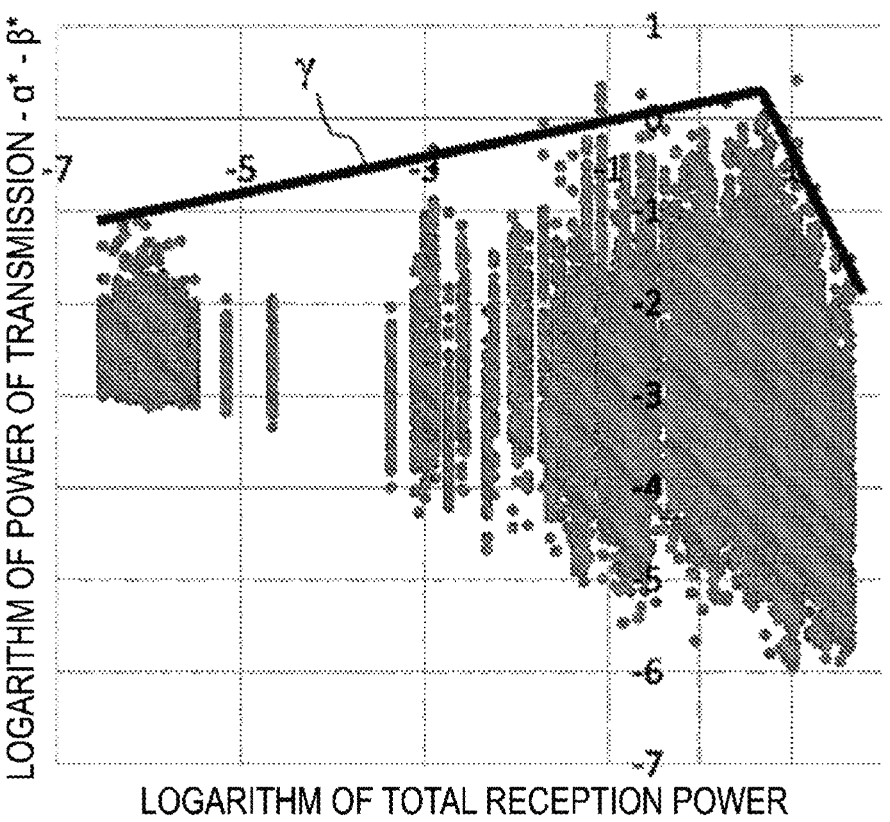
FIG. 7 is a scatter diagram of the logarithm of a total reception power spectrum of a learning reception signal and the logarithm of a power spectrum of transmission.

After calculating β, the estimated echo calculation unit 24 calculates γ. FIG. 7 is a scatter diagram of the logarithm of the total reception power spectrum of a learning reception signal and the logarithm of the power spectrum of transmission. In FIG. 7, the result obtained by subtracting the α component and the β component from the measured data is plotted, and γ is indicated by a line.

For example, when sound of 100 Hz and sound of 110 Hz are output from the speaker 52, sound of 105 Hz may be emitted in addition to the sound of 100 Hz and the sound of 110 Hz from the speaker 52. Therefore, in order to refer to information on whether or not sound other than that having the frequency originally desired to be emitted is emitted, in the present embodiment, a term having the logarithm of the total reception power spectrum as a variable is added to the estimated echo function (Equation (4)).

γ indicates the relationship between the logarithm of the total reception power spectrum and the maximum value of the logarithm of the power spectrum of transmission, β is obtained based on a result of removing outliers from a scatter diagram of the frequency of reception and the logarithm of the power spectrum of transmission. γ is expressed by a linear function or a nonlinear function. In the example illustrated in FIG. 7, γ is a nonlinear function.

Figure 8:
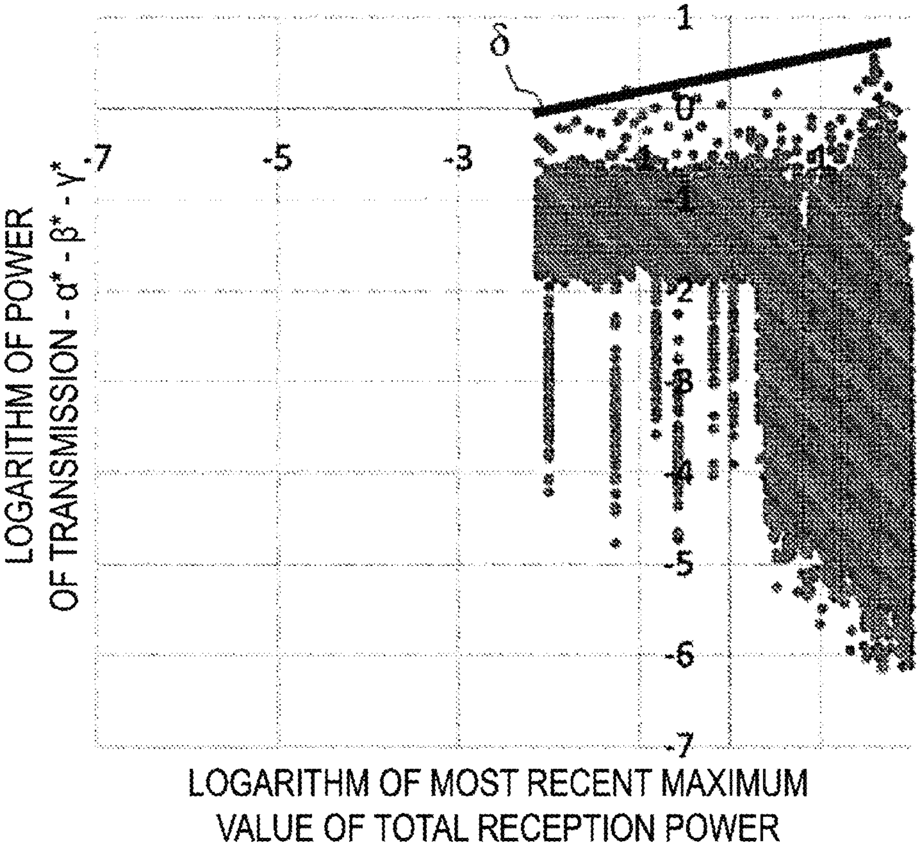
FIG. 8 is a scatter diagram of the logarithm of the envelope of the total reception power spectrum of the learning reception signal and the logarithm of the power spectrum of transmission.

After calculating γ, the estimated echo calculation unit 24 calculates δ. FIG. 8 is a scatter diagram of the logarithm of the envelope of the total reception power spectrum of the learning reception signal and the logarithm of the power spectrum of transmission. In FIG. 8, the result obtained by subtracting the α component, the β component, and the γ component from the measured data is plotted, and δ is indicated by a line.

Reflection of sound in the vehicle, vibration of the speaker 52, and the like are output as sound from the speaker 52, and thus an echo can exist even if there is no learning reception signal. Therefore, it is necessary to estimate the echo with reference to not only the total reception power spectrum at the current time point but also the learning signal in the most recent certain period. Therefore, in the present embodiment, a term having the logarithm of the envelope of the total reception power spectrum as a variable is added to the estimated echo function (Equation (4)).

An envelope A is the maximum value in the most recent certain period, and is gradually calculated as in the following Equation (7) using a time constant B and a total reception power spectrum C. In the present embodiment, the time constant B is set to 0.5 to 1.

If (A<C):

$$A=C$$

Else:

$$A=B\times A+(1-B)\times C \tag{7}$$

δ indicates the relationship between the logarithm of the envelope of the total reception power spectrum and the maximum value of the logarithm of the power spectrum of transmission. δ is obtained based on a result of removing outliers from a scatter diagram of the frequency of reception and the logarithm of the power spectrum of transmission. δ is expressed by a linear function or a nonlinear function. In the example illustrated in FIG. 8, δ is a linear function.

When the estimated echo function (function representing the estimated echo power spectrum [i]) is calculated in this manner, the estimated echo calculation unit 24 stores the estimated echo function into the storage unit 23.

The description will now return to FIG. 2. In the description of FIG. 2, the input signal input from the microphone 51 includes sound and an echo thereof output from the speaker 52 by the reception signal transmitted through the receiving signal path, noise input to the microphone 51, and sound (near-end speech) input to the microphone 51 by the speech (see FIG. 1) of the user A present on the near-end side.

The double-talk detection unit 15 sequentially detects whether or not to be in a double-talk state based on the reception signal [i] obtained by converting the reception signal [t]transmitted through the receiving signal path into a frequency-dependent signal by the FFT unit 22, the transmission signal [i] (here, the suppressed signal after passing through the echo removal unit 11, the FFT unit 12, and the noise suppressing unit 14) to which the input signal is input from the microphone 51, the transmission signal [i] to be transmitted through the transmitting signal path, and the double-talk detection mask.

Note that the double-talk state is a state having near-end speech and far-end speech, and a single-talk state is a state having only near-end speech or only far-end speech. In the present embodiment, the double-talk detection unit 15 is characterized by d method for detecting the presence or absence of near-end speech, and a method for detecting the presence or absence of far-end speech is not limited. For example, the double-talk detection unit 15 may detect that there is far-end speech when the envelope of the total reception power spectrum is greater than a threshold.

Hereinafter, a method in which the double-talk detection unit 15 detects the presence or absence of near-end speech will be described. The reception signal [i] and the transmission signal [i] are sequentially input to the double-talk detection unit 15. When the reception signal [i] and the transmission signal [i] are input (a sample point is acquired), the double-talk detection unit 15 generates a double-talk detection mask based on the estimated echo power spectrum [i] stored in the storage unit 23 and detects whether or not to be in the double-talk state. Every time the sample point is acquired, the double-talk detection unit 15 performs the process of detecting whether or not to be in the double-talk state.

First, the double-talk detection mask will be described. The double-talk detection unit 15 calculates the double-talk detection mask based on the estimated echo power spectrum

[i], the estimated noise power spectrum [i], and the noise suppressing gain [i]. Specifically, as shown in Equation (8), the double-talk detection mask is obtained by adding, to the estimated echo power spectrum [i], a term in which the estimated noise power spectrum [i] is multiplied by the noise suppressing gain [i]. Since the double-talk detection mask is a frequency-dependent signal, it is hereinafter called a double-talk detection mask [i].

$$\text{Double-talk detection mask }[i]=\text{estimated echo power spectrum }[i]+\text{estimated noise power spectrum }[i]\times\text{noise suppressing gain }[i] \quad (8)$$

In Equation (8), the estimated echo power spectrum [i] is obtained by inputting the value of the reception signal [i] into the function (Equation (4)) representing the estimated echo. The estimated noise power spectrum [i] is obtained by the noise estimation unit 13, and the noise suppressing gain [i] is stored in the storage unit 23.

Figure 9:
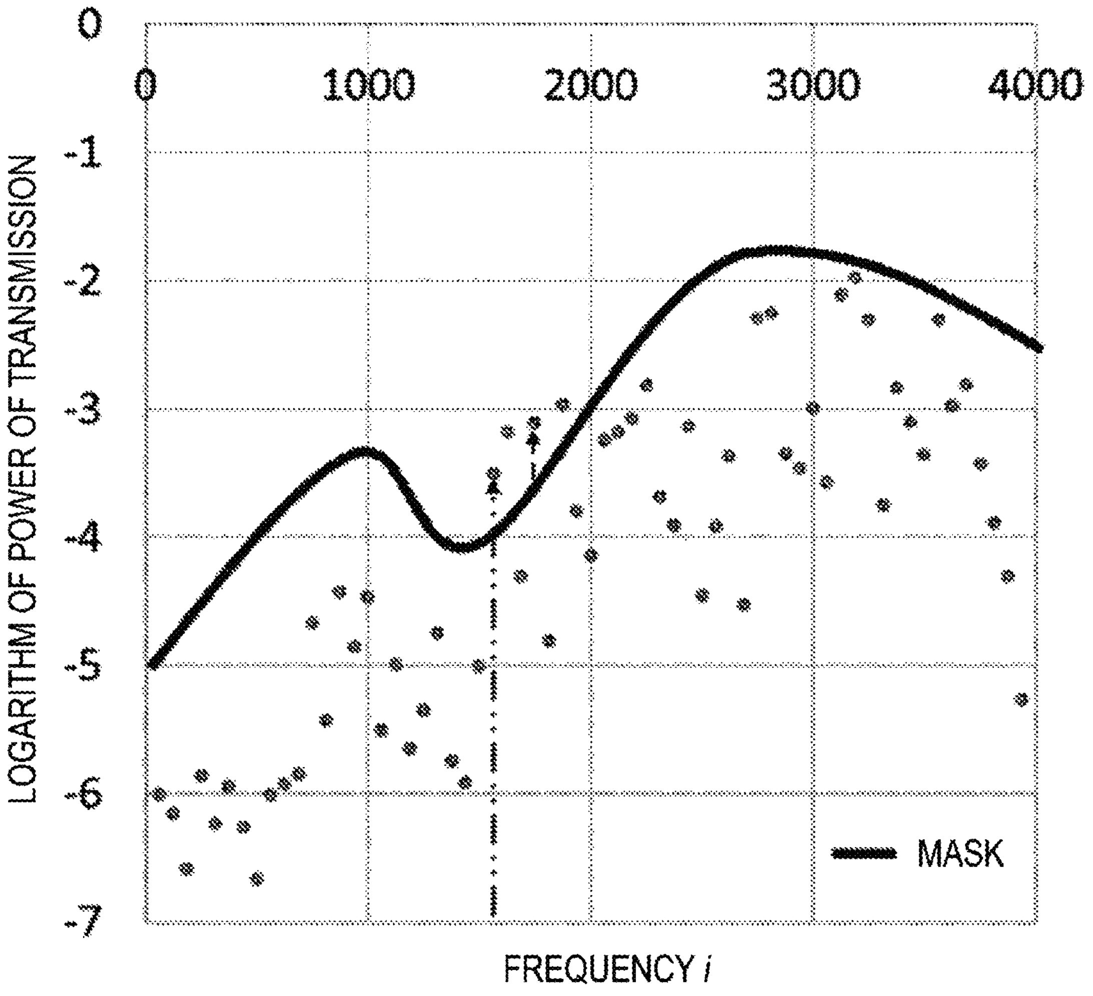
FIG. 9 is a diagram illustrating a state of comparing a suppressed signal of one frame at a certain time with a double-talk detection mask.

Next, the process of detecting whether or not to be in the double-talk state will be described with reference to FIG. 9. FIG. 9 is a diagram illustrating a state of comparing a suppressed signal of one frame at a certain time with the double-talk detection mask. In FIG. 9, each plot represents a suppressed signal, and the line represents the double-talk detection mask. In FIG. 9, the horizontal axis represents the frequency of the suppressed signal, and the vertical axis represents the logarithm of the power spectrum of the suppressed signal.

The double-talk detection unit 15 compares the suppressed signal and the double-talk detection mask for each frequency to detect whether or not to be in the double-talk state. As a method of detecting whether or not to be in the double-talk state, there are three methods of the following patterns A, B, and C. The patterns A, B, and C are methods for determining whether or not the plot of FIG. 9 exceeding the double-talk detection mask is due to near-end speech or an outlier.

Pattern A

The double-talk detection unit 15 compares the magnitude of the suppressed signal with the magnitude of the double-talk detection mask for each frequency, and counts the number of frequencies at which the magnitude of the suppressed signal exceeds the magnitude of the double-talk detection mask (hereinafter, called an excess number). In other words, in the scatter diagram illustrated in FIG. 9, the number of plots present upper than the double-talk detection mask is counted. The double-talk detection unit 15 determines whether the excess number is equal to or less than a threshold I (equivalent to a first threshold) prepared in advance. Note that the threshold I can be set to any value.

Pattern B

The double-talk detection unit 15 compares the magnitude of the suppressed signal with the magnitude of the double-talk detection mask for each frequency, and calculates the summation of the magnitudes of the suppressed signals at frequencies at which the magnitude of the suppressed signal exceeds the magnitude of the double-talk detection mask. In other words, in the scatter diagram illustrated in FIG. 9, the summation of the values of the plots upper than the double-talk detection mask (see the two-dot chain line in FIG. 9) is obtained.

For example, the summation of the magnitudes of the suppressed signals is a value in which a constant (e.g., −7) is subtracted from the logarithmic value of the power spectrum of the suppressed signal. Since the logarithm of the power spectrum of the suppressed signal can take a negative value, the negative value is subtracted to have a positive value. For example, the summation of the magnitudes of the suppressed signals may be the summation of the power spectra of the suppressed signals. Since the power spectrum of the suppressed signal is not logarithmic and is a positive value, it is only necessary to simply calculate the summation.

The double-talk detection unit 15 determines whether or not the summation of the magnitudes of the suppressed signals is equal to or less than a threshold II (equivalent to a second threshold) prepared in advance. Note that the threshold II can be set to any value.

Pattern C

The double-talk detection unit 15 compares the magnitude of the suppressed signal with the magnitude of the double-talk detection mask for each frequency, and calculates the summation of differences between the magnitude of the suppressed signal (here, the logarithm of the power spectrum of the suppressed signal) and the magnitude of the double-talk detection mask at frequencies at which the magnitude of the suppressed signal exceeds the magnitude of the double-talk detection mask. In other words, in the scatter diagram illustrated in FIG. 9, the summation of the differences (see the dotted line in FIG. 9) between the magnitude of the plot upper than the double-talk detection mask and the magnitude of the double-talk detection mask is obtained.

The double-talk detection unit 15 determines whether or not the summation of the differences between the magnitude of the suppressed signal and the magnitude of the double-talk detection mask is equal to or less than a threshold III (equivalent to a third threshold) prepared in advance. Note that the threshold III can be set to any value.

The double-talk detection unit 15 detects whether or not the value calculated by any of the methods of the patterns A to C is equal to or greater than the threshold (threshold I, II, or III). Then, the double-talk detection unit 15 determines that there is near-end speech when the number of frames in which the calculated value is equal to or greater than the threshold is continuously equal to or greater than a predetermined number (e.g., two frames).

For example, the double-talk detection unit 15 increases the value of the counter by 1 (count up) when the calculated value is equal to or greater than the threshold, and decreases the value of the counter by 1 (count down) or sets the counter to 0 when the calculated value is less than the threshold. Then, the double-talk detection unit 15 determines that there is near-end speech when the value of the counter becomes equal to or greater than a threshold (e.g., 2).

The pattern C has the largest calculation amount, but when the plot of FIG. 9 exceeds the double-talk detection mask, it is possible to most accurately determine whether it is due to near-end speech or an outlier.

Note that for example, in a case where the state is shifted from a state of having only near-end speech to a state of having only far-end speech, and in a case where the state is shifted from the double-talk state to a state of having only near-end speech, having only far-end speech, or having none of near-end speech and far-end speech, the double-talk detection unit 15 needs not detect whether or not to be in the double-talk state. In particular, in a case where the state is shifted from the double-talk state to the state of having none of near-end speech and far-end speech, there is a high possibility that an echo still remains, and in a case where the state is shifted from the double-talk state to a state of having no far-end speech, there is a high possibility of having near-end speech. Therefore, it is not necessary to detect whether or not to be in the double-talk state for a predetermined time after shifting.

The description will now return to FIG. 2. The nonlinear echo suppressing unit 16 performs a process (hereinafter, called nonlinear echo suppressing process) of suppressing a nonlinear echo on the transmission signal [i] (here, the suppressed signal after passing through the echo removal unit 11, the FFT unit 12, and the noise suppressing unit 14) to which the input signal is input from the microphone 51, the transmission signal [i] to be transmitted through the transmitting signal path. In the present embodiment, the nonlinear echo suppressing unit 16 performs the nonlinear echo suppressing process by multiplying the transmission signal [i] by the echo suppressing gain calculated based on an echo suppressing mask generated based on an estimated echo. The nonlinear echo suppressing unit 16 sets the echo suppressing gain to a different value based on the detection result of the double-talk detection unit 15.

The reception signal [i], the transmission signal [i], and the detection result in the double-talk detection unit 15 are sequentially input to the nonlinear echo suppressing unit 16. The nonlinear echo suppressing unit 16 generates the echo suppressing mask based on the estimated echo function stored in the storage unit 23 when the transmission signal [i] is input (sample point is acquired), and performs the nonlinear echo suppressing process.

The nonlinear echo suppressing unit 16 calculates the echo suppressing mask based on the estimated echo power spectrum [i], the estimated noise power spectrum [i], and the noise suppressing gain [i]. Specifically, as shown in Equation (9), the echo suppressing mask is obtained by adding, to the estimated echo power spectrum [i], a term in which the estimated noise power spectrum [i] is multiplied by the noise suppressing gain [i]. Since the echo suppressing mask is a frequency-dependent signal, it is hereinafter called an echo suppressing mask [i].

$$\text{Echo suppressing mask}[i]=\text{estimated echo power spectrum }[i]+\text{estimated noise power spectrum }[i]\times\text{noise suppressing gain }[i] \qquad (9)$$

Also in the case of Equation (9), similarly to the case of Equation (8), the estimated echo power spectrum [i] is obtained by inputting the value of the reception signal [i] into Equation (4), and the estimated noise power spectrum [i] is obtained by the noise estimation unit 13, and the noise suppressing gain [i] is stored in the storage unit 23.

Figure 10:
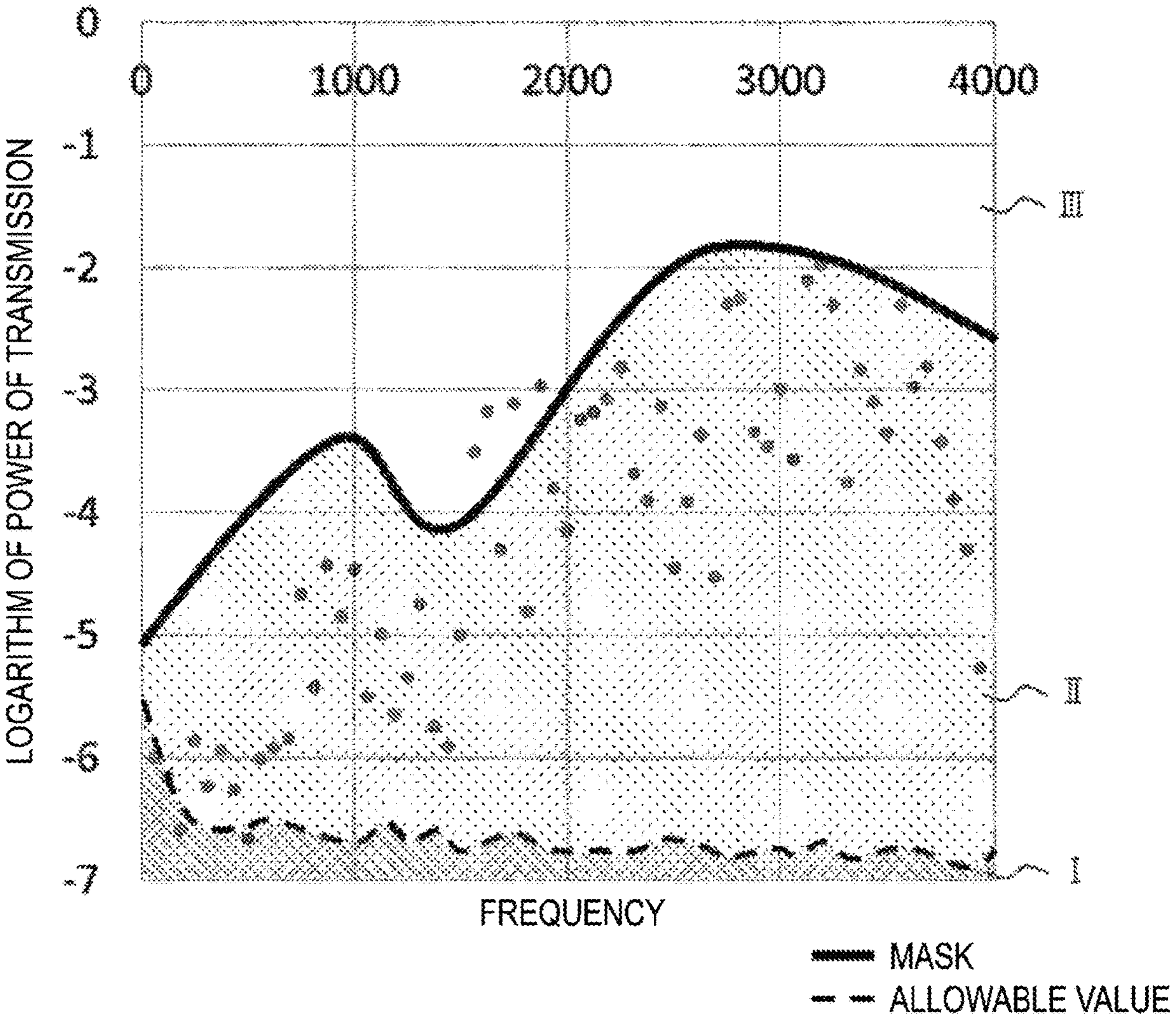
FIG. 10 is a diagram illustrating a state of comparing a suppressed signal of one frame at a certain time with an echo suppressing mask.

FIG. 10 is a diagram illustrating a state of comparing a suppressed signal of one frame at a certain time with an echo suppressing mask. In FIG. 10, each plot represents a suppressed signal, the solid line represents an echo suppressing mask, and the dotted line represents an allowable value. In FIG. 10, the horizontal axis represents the frequency of the suppressed signal, and the vertical axis represents the logarithm of the power spectrum of the suppressed signal.

The nonlinear echo suppressing unit 16 performs the echo suppressing process on each plot so as to reduce the magnitude of the echo suppressing mask to the allowable value. Hereinafter, the echo suppressing process will be described in detail.

First, the allowable value will be described. The allowable value indicates the magnitude of the residual echo allowed for the transmission signal [i], and is obtained based on the estimated noise power spectrum [i] and the noise suppressing gain [i] as shown in Equation (10). Since the allowable value is a frequency-dependent signal, it is hereinafter called an allowable value [i].

$$\text{Allowable value }[i]=\text{estimated noise power spectrum }[i]\times\text{noise suppressing gain }[i]+L \qquad (10)$$

L is a constant. Note that L may be changed based on the magnitude of the estimated noise power spectrum [i] and the detection result in the double-talk detection unit 15.

Figure 11:
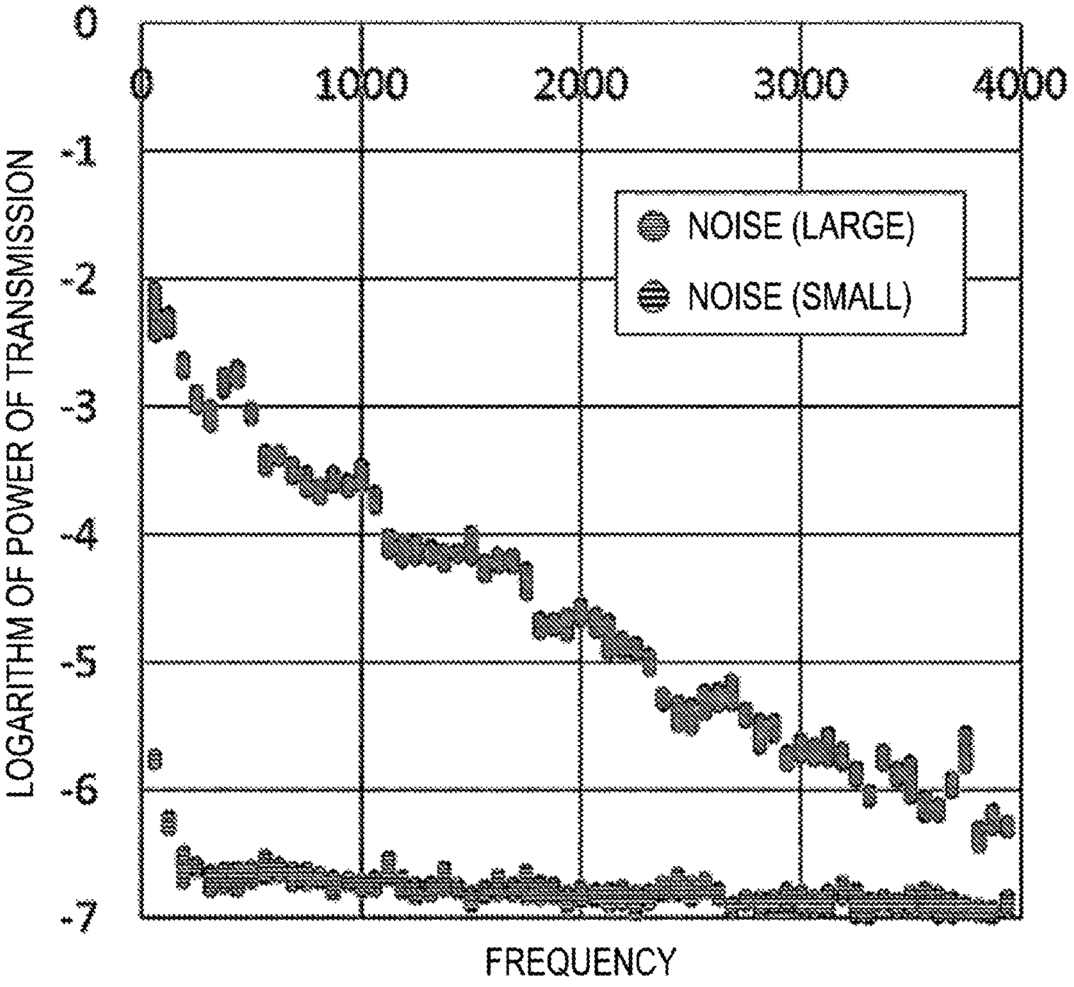
FIG. 11 is a graph showing an example of an allowable value [i].

FIG. 11 is a graph showing an example of the allowable value [i]. The allowable value increases when the estimated noise power spectrum [i] is large, and the allowable value decreases when the estimated noise power spectrum [i] is small.

The description will now return to FIG. 10. The allowable value [i] in FIG. 10 is the allowable value [i] when the estimated noise power spectrum [i] in FIG. 11 is small. The nonlinear echo suppressing unit 16 calculates a basic gain G based on the following Equation (11). Since the gain G is a frequency-dependent signal, it is hereinafter called a G [i].

$$G[i]=10^{\frac{\text{ECHO SUPPRESSING MASK }[i]-\text{ALLOWABLE VALUE }[i]}{2}} \qquad (11)$$

Note that Equation (9) is calculated based on the following Equations (12) to (15) with the input signal as X ($Z=\log_{10}\mathrm{Re}(X)\times\mathrm{Re}(X)+\mathrm{Im}(X)\times\mathrm{Im}(X)$, where Z is the logarithm of the power spectrum of the input signal, Re is the real part, and Im is the imaginary part) and the target signal as Y ($\mathrm{Re}(Y)=\mathrm{Re}(X)\times G$, $\mathrm{Im}(Y)=\mathrm{Im}(X)\times G$).

$$Y^2=G^2\times X^2 \qquad (12)$$

$$\log_{10}G^2=\log_{10}\frac{X^2}{Y^2} \qquad (13)$$

$$2\times\log_{10}G=\log_{10}X^2-\log_{10}Y^2 \qquad (14)$$

$$G=10^{\log_{10}G}=10^{0.5\times(\log_{10}X^2-\log_{10}Y^2)} \qquad (15)$$

The nonlinear echo suppressing unit 16 generates the echo suppressing mask [i] and the allowable value [i] for each frame. Then, the nonlinear echo suppressing unit 16 compares the magnitude of the transmission signal [i] with the magnitude of the echo suppressing mask [i] and the magnitude of the transmission signal [i] with the magnitude of the allowable value [i] for each frame. Then, the nonlinear echo suppressing unit 16 calculates echo suppressing gains G1 to G5 for each frame based on the comparison result and the detection result in the double-talk detection unit 15. The echo suppressing gains G1 to G5 are obtained as in the following Equations (16) to (20) using the basic gain G obtained by Equation (11). Note that Z in Equations (16) to (20) is the logarithm of the power spectrum of the transmission signal [i] (the magnitude of the transmission signal [i]), and is the value on the vertical axis of each plot in FIG. 10.

$$Z\le\text{allowable value: }G1=1.0 \qquad (16)$$

$$Z>\text{ALLOWABLE VALUE AND }Z\le\text{ ECHO SUPPRESSING MASK AND NEAR-END SPEECH IS NOT PRESENT}: G2=10^{\frac{Z-\text{ALLOWABLE VALUE}}{2}} \qquad (17)$$

-continued $$Z > \text{ALLOWABLE VALUE AND } Z \leq \text{ ECHO SUPPRESSING MASK AND NEAR-END SPEECH IS PRESENT}: G3 = 10^{W1 \times \frac{Z - \text{ALLOWABLE VALUE}}{2}} \quad (18)$$

$$Z > \text{ALLOWABLE VALUE AND } Z > \text{ ECHO SUPPRESSING MASK AND NEAR-END SPEECH IS NOT PRESENT}: G4 = 10^{\frac{\text{THRESHOLD} - \text{ALLOWABLE VALUE}}{2}} \quad (19)$$

$$Z > \text{ALLOWABLE VALUE AND } Z > \text{ ECHO SUPPRESSING MASK AND NEAR-END SPEECH IS PRESENT}: G5 = 10^{W2 \times \frac{\text{THRESHOLD} - \text{ALLOWABLE VALUE}}{2}} \quad (20)$$

As shown in Equation (16), when Z is equal to or less than the allowable value (a shaded part I in FIG. 10), the nonlinear echo suppressing unit 16 sets the echo suppressing gain G1 to 1 and does not perform echo suppression.

As shown in Equations (17) and (18), when Z is greater than the allowable value and is equal to or less than the magnitude of the echo suppressing mask (a shaded part II in FIG. 10), the echo suppressing gains G2 and G3 are obtained based on a value (Z—allowable value) obtained by subtracting the allowable value from the magnitude of the transmission signal. In other words, when Z is greater than the allowable value and is equal to or less than the magnitude of the echo suppressing mask, the nonlinear echo suppressing unit 16 performs echo suppression so as to reduce the magnitude of the transmission signal to the allowable value.

Then, when there is near-end speech, the nonlinear echo suppressing unit 16 obtains the echo suppressing gain G3 by multiplying a value obtained by subtracting the allowable value from the magnitude of the transmission signal by a constant W1. The constant W1 is any number from 0 to 1. In other words, the nonlinear echo suppressing unit 16 weakens echo suppression when there is near-end speech. Note that when W1 is 1, the echo suppressing gain G2 and the echo suppressing gain G3 match.

As shown in Equations (19) and (20), when Z is greater than the allowable value and the magnitude of the echo suppressing mask (a non-shaded part III in FIG. 10), the echo suppressing gains G4 and G5 are obtained based on a value (echo suppressing mask—allowable value) obtained by subtracting the allowable value from the magnitude of the echo suppressing mask. In other words, when Z is greater than the allowable value and the echo suppressing mask, the nonlinear echo suppressing unit 16 performs echo suppression so as to reduce the magnitude of the echo suppressing mask to the allowable value.

Then, when there is near-end speech, the nonlinear echo suppressing unit 16 obtains the echo suppressing gain G5 by multiplying a value obtained by subtracting the allowable value from the echo suppressing mask by a constant W2. The constant W2 is any number from 0 to 1. In other words, the nonlinear echo suppressing unit 16 weakens echo suppression when there is near-end speech. Note that when W2 is 1, the echo suppressing gain G4 and the echo suppressing gain G5 match. Note that the value of W2 may be the same as or different from the value of W1.

The nonlinear echo suppressing unit 16 performs the nonlinear echo suppressing process using the obtained echo suppressing gains G1 to G5 for each measurement point in each frame.

The description will now return to FIG. 2. The noise superimposition unit 17 generates comfort noise based on the estimated noise signal estimated by the noise estimation unit 13, and superimposes the comfort noise on the transmission signal on which the echo suppressing process has been performed by the nonlinear echo suppressing unit 16.

The IFFT unit 18 performs inverse fast Fourier transform (IFFT) on the input signal having passed through the noise superimposition unit 17.

Figure 12:
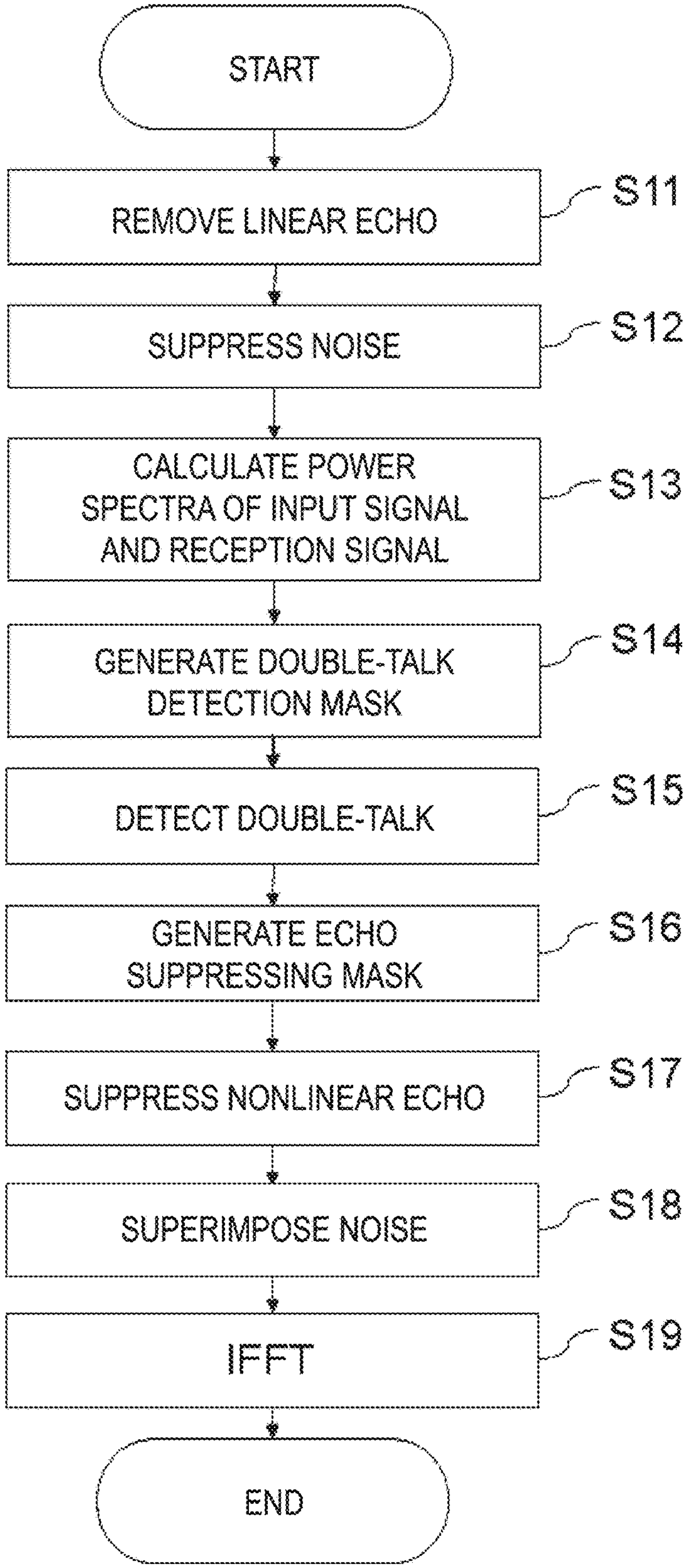
FIG. 12 is a flowchart showing a flow of a process in which the echo suppressing device 1 reduces an echo.

FIG. 12 is a flowchart showing the flow of the process in which the echo suppressing device 1 sequentially reduces an echo. The processing is performed continuously at every predetermined time while the reception signal and the input signal are input to the echo suppressing device 1.

First, the echo removal unit 11 removes an echo from the input signal (step S11). The noise estimation unit 13 estimates the estimated noise signal included in the echo removal signal, and the noise suppressing unit 14 suppresses the noise signal from the echo removal signal based on the estimated noise signal to generate a suppressed signal (step S12).

The double-talk detection unit 15 calculates the power spectrum of the suppressed signal and the reception signal (step S13), acquires the estimated echo power spectrum [i] from the storage unit 23, generates a double-talk detection mask based on the acquired estimated echo and the power spectrum calculated in step S13 (step S14), and detects the presence or absence of near-end speech using the double-talk detection mask generated in step S14 (step S15).

Next, the nonlinear echo suppressing unit 16 acquires the estimated echo power spectrum [i] from the storage unit 23, generates an echo suppressing mask based on the acquired estimated echo and the power spectrum calculated in step S13 (step S16), and performs the echo suppressing process on the suppressed signal using the presence or absence of near-end speech detected in step S15 and the echo suppressing mask generated in step S16 (step S17).

Next, the noise superimposition unit 17 generates comfort noise based on the estimated noise signal estimated by the noise estimation unit 13, and superimposes the comfort noise on the transmission signal on which the echo suppressing process has been performed in step S17 (step S18). Finally, the IFFT unit 18 returns the transmission signal on which the noise has been superimposed to a time axis signal (step S19).

According to the present embodiment, since the nonlinear echo suppressing process is performed using the echo suppressing mask generated by inputting the value of the reception signal to the estimated echo function (estimated echo power spectrum [i]), the echo suppression amount can be accurately estimated even when a nonlinear echo component is large.

According to the present embodiment, since the presence or absence of near-end speech is detected using the double-talk detection mask generated by inputting the value of the reception signal to the function representing the estimated echo power spectrum [i], the presence or absence of the near-end speech can be accurately detected. In particular, by detecting the presence or absence of near-end speech by the method (pattern C) of calculating the summation of differences between the magnitude of the suppressed signal and the magnitude of the double-talk detection mask at frequencies where the suppressed signal exceeds the value of the double-talk detection mask, it is possible to accurately detect whether the data is near-end speech or an outlier when the input signal is greater than the double-talk detection mask.

According to the present embodiment, the presence or absence of near-end speech can be accurately detected by adding, to Equation (8) for obtaining the double-talk detection mask, a term obtained by multiplying the estimated noise power spectrum [i] by the noise suppressing gain [i]. For example, there is a risk that the value of the transmission signal becomes greater than the double-talk detection mask due to not near-end speech but the influence of noise. On the other hand, erroneous detection due to the influence of noise can be prevented by adding, to Equation (8) for obtaining the double-talk detection mask, a term obtained by multiplying the estimated noise power spectrum [i] by the noise suppressing gain [i].

According to the present embodiment, the nonlinear echo suppressing process can be appropriately performed by adding, to Equation (9) for obtaining the echo suppressing mask, a term obtained by multiplying the estimated noise power spectrum [i] by the noise suppressing gain [i].

According to the present embodiment, since the allowable value, which is the value of the residual echo allowed based on the noise component estimated by the noise estimation unit 13 and the noise suppressing gain used by the noise suppressing unit 14, is obtained, and the nonlinear echo suppressing process is performed using the echo suppressing gain obtained based on the difference between the echo suppressing mask and the allowable value, it is possible to prevent the echo from being suppressed excessively. For example, it is not necessary to make the magnitude after the nonlinear echo suppressing process smaller than the value of the transmission signal [i] when there is none of near-end speech and far-end speech, and the disadvantage of making the sound unnatural due to the nonlinear echo suppressing process due to the excessively increased echo suppressing gain becomes larger. Therefore, in the nonlinear echo suppressing process, it is desirable to adjust the echo suppressing gain so that the magnitude of the signal after the process does not become smaller than the allowable value obtained based on the noise component. In particular, when the value of the transmission signal [i] is greater than the allowable value and equal to or less than the echo suppressing mask (the shaded part II in FIG. 10), the echo suppressing gains G2 and G3 are obtained based on the value (Z—allowable value) obtained by subtracting the allowable value from the transmission signal, and when the transmission signal [i] is greater than the allowable value and the echo suppressing mask (the non-shaded part III in FIG. 10), the echo suppressing gains G4 and G5 are obtained based on a value (echo suppressing mask—allowable value) obtained by subtracting the allowable value from the echo suppressing mask, whereby it is possible to appropriately suppress the echo.

According to the present embodiment, when Z is greater than the allowable value and is equal to or less than the magnitude of the echo suppressing mask, echo suppression is performed so as to reduce the magnitude of the transmission signal to the allowable value, and when Z is greater than the allowable value and the echo suppressing mask, echo suppression is performed so as to reduce the magnitude of the echo suppressing mask to the allowable value, whereby it is possible to appropriately suppress the echo according to the magnitude of Z.

According to the present embodiment, by making the echo suppressing gains G3 and G5 when there is near-end speech to be smaller than the echo suppressing gains G2 and G4 when there is no near-end speech, it is possible to prevent the echo from being suppressed excessively. In general, when there is near-end speech, the speaker tends not to care about echoes. Therefore, when there is near-end speech, suppression of the echo is weakened, and it is possible to prevent the sound from becoming unnatural due to excessive suppression of the echo.

According to the present embodiment, since the coefficients α, β, γ, and δ of the estimated echo power spectrum [i] are obtained based on data in which outliers are excluded from the learning signal [i], the magnitude of the double-talk detection mask can be prevented from becoming larger than necessary, and the presence or absence of near-end speech can be accurately detected. For example, if each coefficient of the estimated echo power spectrum [i] is obtained with an outlier added, there is a risk that the value of the transmission signal [i] does not exceed the double-talk detection mask when the voice of the near-end speaker is small. On the other hand, by obtaining the coefficients α, β, γ, and δ of the estimated echo power spectrum [i] based on data in which outliers are excluded from the learning signal [i], it is possible to detect that there is near-end speech even if the voice of the near-end speaker is small. Since the coefficients α, β, γ, and δ of the estimated echo power spectrum [i] are obtained based on data in which outliers are excluded from the learning signal [i], the magnitude of the echo suppressing mask can be prevented from becoming larger than necessary, and the echo can be prevented from being excessively suppressed.

Note that in the present embodiment, by using the detection result in the double-talk detection unit 15, the nonlinear echo suppressing unit 16 makes the echo suppressing gain smaller when there is near-end speech than that when there is no near-end speech, but the double-talk detection unit 15 is not essential, and the nonlinear echo suppressing unit 16 needs not perform the process using the detection result in the double-talk detection unit 15. For example, the nonlinear echo suppressing unit 16 may perform the nonlinear echo suppressing process using the echo suppressing gains G1, G2, and G5 obtained by Equations (15), (16), and (18).

In the present embodiment, the coefficients α, β, γ, and δ of the estimated echo power spectrum [i] are obtained based on data in which outliers are excluded from the learning signal [i], and the double-talk detection mask and the echo suppressing mask are obtained using the coefficients α, β, γ, and δ, but the estimated echo power spectrum [i] on which the double-talk detection mask is based and the estimated echo power spectrum [i] on which the echo suppressing mask is based may be different from each other.

For example, the estimated echo calculation unit 24 generates a first estimated echo function (first estimated echo power spectrum [i]) in which a coefficient of each variable is obtained based on data in which an outlier is excluded from the learning signal [i] and a second estimated echo function (second estimated echo power spectrum [i]) in which a coefficient of each variable is obtained based on the learning reception signal [i] from which an outlier is not excluded, and the storage unit 23 stores the first estimated echo power spectrum [i] and the second estimated echo power spectrum [i] as the estimated echo power spectrum [i]. Then, the double-talk detection unit 15 obtains the double-talk detection mask based on the first estimated echo power spectrum [i], and the nonlinear echo suppressing unit 16 obtains the echo suppressing mask based on the second estimated echo power spectrum [i]. This can perform sufficient echo suppression by enhancing suppression of nonlinear echo while accurately detecting the presence or absence of near-end speech.

In the present embodiment, the noise estimation unit 13 and the noise suppressing unit 14 are included, and in Equation (8) for obtaining the double-talk detection mask [i] and Equation (9) for obtaining the echo suppressing mask [i], a term in which the estimated noise power spectrum [i] is multiplied by the noise suppressing gain [i] is added to the estimated echo power spectrum [i], but the noise estimation unit 13 and the noise suppressing unit 14 are not essential, and also it is not essential to add, to Equations (8) and (9), a term in which the estimated noise power spectrum [i] is multiplied by the noise suppressing gain [i]. However, in order to perform accurate detection of near-end speech and appropriate suppression of the echo, it is desirable to add, to Equations (8) and (9), a term in which the estimated noise power spectrum [i] is multiplied by the noise suppressing gain [i].

In the present embodiment, in the nonlinear echo suppressing process, the allowable value is obtained based on the estimated noise power spectrum [i] and the noise suppressing gain [i], and the echo suppressing gain such that the magnitude of the echo suppressing mask [i] is reduced to the allowable value is obtained, but it is not necessary to use the allowable value in the nonlinear echo suppressing process. For example, the nonlinear echo suppressing unit 16 may perform the nonlinear echo suppressing process using an echo suppressing gain that reduces the magnitude of the echo suppressing mask [i] to 0 or any value. However, in order to prevent the sound from becoming unnatural due to excessive suppression of the echo, it is desirable to perform the nonlinear echo suppressing process so that the magnitude of the echo suppressing mask [i] is reduced to the magnitude of the allowable value.

In the present embodiment, the allowable value [i] is a frequency-dependent signal, but the allowable value may be a frequency-independent constant. For example, the mean value of the allowable values [i] may be set as a frequency-independent allowable value (constant), and G [i] may be obtained using the allowable value (constant).

In the present embodiment, the estimated echo calculation unit 24 is provided in the echo suppressing device 1, but the estimated echo calculation unit 24 may be provided in an arithmetic device or the like different from the echo suppressing device 1. For example, the estimated echo calculation unit 24 only needs to acquire the learning signal [i] and the learning reception signal [i] via a storage medium, a network, or the like not illustrated, and store the generated estimated echo power spectrum [i] into the storage unit 23 via a storage medium, a network, or the like not illustrated.

In the present embodiment, the estimated echo power spectrum [i] is obtained using the scatter diagrams (FIGS. 5 to 8) of the learning signal [i] with respect to the learning reception signal [i] at a certain time, but since data in which the logarithm of the power spectrum of transmission is equal to or less than a certain constant value (e.g., −5) in each scatter diagram does not affect the calculation of the estimated echo power spectrum [i], the estimated echo power spectrum [i] may be obtained using data in which data in which the logarithm of the power spectrum of transmission is equal to or less than a certain constant value has been deleted. This can reduce the data amount and the calculation amount.

In the present embodiment, the estimated echo power spectrum [i] is obtained using the scatter diagrams (FIGS. 5 to 8) of the learning signal [i] with respect to the learning reception signal [i] at a certain time, but the method of obtaining the estimated echo power spectrum [i] from the learning reception signal [i] and the learning signal [i] is not limited to this. For example, the estimated echo power spectrum [i] may be obtained using a known statistical method or deep learning.

Although the power spectrum is used in the present embodiment, an amplitude spectrum may be used instead of the power spectrum. In the case of using the amplitude spectrum, for the magnitude of the signal of the present invention, the absolute value of the amplitude of the signal only needs to be used as the magnitude of the signal, and for the total reception amplitude spectrum equivalent to the total reception value of the present invention, the summation of the absolute values of the amplitude spectrum at each frequency of the learning signal only needs to be used as shown in Equation (21). The total reception amplitude spectrum may be the summation of the amplitude spectrum at each frequency in any frequency range of the learning signal as shown in Equation (22) (A>0, B<F_MAX).

$$\text{TOTAL RECEPTION AMPLITUDE SPECTRUM} = \sum_{i=0}^{F\_MAX} |\text{RECEPTION AMPLITUDE SPECTRUM}|\,[i] \tag{21}$$

$$\text{TOTAL RECEPTION AMPLITUDE SPECTRUM} = \sum_{i=A}^{B} |\text{RECEPTION AMPLITUDE SPECTRUM}|\,[i] \tag{22}$$

In the present embodiment, the echo removal unit 11 is provided before the FFT unit 12, but the echo removal unit 11 may be provided after the FFT unit 12 or may be provided after the noise suppressing unit 14. Although the noise superimposition unit 17 is provided after the nonlinear echo suppressing unit 16, the noise superimposition unit 17 may be provided after the restoration unit (IFFT unit) 18.

In the present embodiment, the noise suppressing unit 14 provided before the nonlinear echo suppressing unit 16, but the noise suppressing unit 14 may be provided after the nonlinear echo suppressing unit 16. In this case, the term in which the estimated noise power spectrum [i] is multiplied by the noise suppressing gain [i] is unnecessary in Equations (8) and (9).

The embodiments of the invention are described above in detail with reference to the drawings. However, specific configurations are not limited to the embodiments and also include changes in design or the like without departing from the gist of the invention. In particular, in the embodiment, generation of the basic mask, generation and selection of the optimum mask, detection of the double-talk state, and the like are performed based on the power spectrum expressed by the square of amplitude, but these processes may be performed based on the absolute value of the amplitude.

REFERENCE SIGNS LIST

1 Echo suppressing device
11 Echo removal unit
12, 22 FFT unit
13 Noise estimation unit
14 Noise suppressing unit
15 Double-talk detection unit
16 Nonlinear echo suppressing unit
17 Noise superimposition unit
18 IFFT unit
21 Dynamic range control

23 Storage unit
24 Estimated echo calculation unit
50 Terminal
51 Microphone
52 Speaker
53, 54 Cell phone
55 Speaker amplifier
100 Voice communication system

The invention claimed is:

1. An echo suppressing device that suppresses an echo caused when a reception signal is transmitted through a receiving signal path through which a signal is transmitted to a speaker and voice output from the speaker by the reception signal is input to a microphone, the echo suppressing device comprising:

a storage unit that stores an estimated echo function calculated based on a second learning reception signal in which a learning reception signal transmitted through the receiving signal path is converted into a frequency domain and a second learning signal in which a learning signal transmitted through a transmitting signal path for transmitting a signal input from the microphone when sound output from the speaker by the learning reception signal input to the microphone is converted into a frequency domain, the estimated echo function having variables of a logarithm of a magnitude at each frequency of the reception signal, a frequency of the reception signal, a logarithm of a total reception value that is a summation of magnitudes of the reception signal or transmission of the reception signal in any frequency range, and a logarithm of an envelope of the total reception value; and a nonlinear echo suppressing unit that performs an echo suppressing process by inputting a value of a second reception signal in which the reception signal is converted into a frequency domain to the estimated echo function to generate an echo suppressing mask, and multiplying an echo suppressing gain calculated based on the echo suppressing mask by a second transmission signal in which a transmission signal transmitted through the transmitting signal path converted into a frequency domain.

2. The echo suppressing device according to claim 1, further comprising:

a double-talk detection unit that inputs a value of the second reception signal to the estimated echo function to generate a double-talk detection mask and sequentially detects whether or not speech has been input to the microphone based on the second transmission signal and the double-talk detection mask, wherein the nonlinear echo suppressing unit makes the echo suppressing gain smaller in a case where speech is input to the microphone than that in a case where speech has not been input to the microphone.

3. The echo suppressing device according to claim 2, wherein by comparing a magnitude of the second transmission signal with a magnitude of the double-talk detection mask for each frequency, the double-talk detection unit detects that no speech has been input to the microphone based on whether or not a number of frequencies at which the magnitude of the second transmission signal exceeds the magnitude of the double-talk detection mask is less than a first threshold, whether or not a summation of magnitudes of the second transmission signal in a frequency band at which the magnitude of the second transmission signal exceeds the magnitude of the double-talk detection mask is less than a second threshold, or whether or not a summation of differences between the magnitude of the second transmission signal and the magnitude of the double-talk detection mask in a frequency band at which the magnitude of the second transmission signal exceeds the magnitude of the double-talk detection mask is less than a third threshold.

4. The echo suppressing device according to claim 2, further comprising:

a noise estimation unit that estimates a noise component included in the second transmission signal; and a noise suppressing unit that suppresses a noise signal from an echo removal signal by multiplying the second transmission signal by a noise suppressing gain, wherein the double-talk detection unit obtains the double-talk detection mask based on the estimated echo, the noise component, and the noise suppressing gain.

5. The echo suppressing device according to claim 2, wherein the estimated echo function includes a first function in which a coefficient of each variable is obtained based on data in which an outlier is excluded from the second learning signal, and a second function in which a coefficient of each variable is obtained based on the second learning signal in which an outlier is not excluded, the double-talk detection mask is obtained based on the first function, and the echo suppressing mask is obtained based on the second function.

6. The echo suppressing device according to claim 1, further comprising:

a noise estimation unit that estimates a noise component included in the second transmission signal; and a noise suppressing unit that suppresses a noise signal from an echo removal signal by multiplying the second transmission signal by a noise suppressing gain, wherein the nonlinear echo suppressing unit obtains the echo suppressing mask based on the estimated echo, the noise component, and the noise suppressing gain.

7. The echo suppressing device according to claim 6, wherein the nonlinear echo suppressing unit obtains an allowable value indicating a magnitude of an allowable residual echo based on the noise component and the noise suppressing gain, and multiplies the second transmission signal by the echo suppressing gain that reduces a magnitude of the echo suppressing mask to a magnitude of the allowable value.

8. The echo suppressing device according to claim 7, wherein the nonlinear echo suppressing unit obtains the echo suppressing gain based on a value obtained by subtracting the allowable value from the magnitude of the second transmission signal when the magnitude of the second transmission signal is greater than the allowable value and is equal to or less than the echo suppressing mask, and obtains the echo suppressing gain based on a value obtained by subtracting the allowable value from the echo suppressing mask when a value of the second transmission signal is greater than the allowable value and the echo suppressing mask.

9. The echo suppressing device according to claim 1, wherein in the estimated echo function, a coefficient of each variable is obtained based on data where an outlier is excluded from the second learning signal.

10. An echo suppressing method for suppressing an echo caused when a reception signal is transmitted through a receiving signal path through which a signal is transmitted to a speaker and voice output from the speaker by the reception signal is input to a microphone, the echo suppressing method comprising:

a step of acquiring an estimated echo function calculated based on a second learning reception signal in which a learning reception signal transmitted through the receiving signal path is converted into a frequency domain and a second learning signal in which a learning signal transmitted through a transmitting signal path for transmitting a signal input from the microphone when sound output from the speaker by the learning reception signal input to the microphone is converted into a frequency domain, the estimated echo stored in a storage unit, the estimated echo function having variables of a logarithm of a magnitude at each frequency of the reception signal, a frequency of the reception signal, a logarithm of a total reception value that is a summation of magnitudes of the reception signal or transmission of the reception signal in any frequency range, and a logarithm of an envelope of the total reception value; and a step of performing an echo suppressing process by inputting a value of a second reception signal in which the reception signal is converted into a frequency domain to the estimated echo function to generate an echo suppressing mask, and multiplying an echo suppressing gain calculated based on the echo suppressing mask by a second transmission signal in which a transmission signal transmitted through the transmitting signal path converted into a frequency domain.

11. A non-transitory computer readable medium storing an echo suppressing program that causes a computer to perform a step of acquiring an estimated echo function calculated based on a second learning reception signal in which a learning reception signal transmitted through the receiving signal path is converted into a frequency domain and a second learning signal in which a learning signal transmitted through a transmitting signal path for transmitting a signal input from the microphone when sound output from the speaker by the learning reception signal input to the microphone is converted into a frequency domain, the estimated echo stored in a storage unit, the estimated echo function having variables of a logarithm of a magnitude at each frequency of the reception signal, a frequency of the reception signal, a logarithm of a total reception value that is a summation of magnitudes of the reception signal or transmission of the reception signal in any frequency range, and a logarithm of an envelope of the total reception value; and a step of performing an echo suppressing process by inputting a value of a second reception signal in which the reception signal is converted into a frequency domain to the estimated echo function to generate an echo suppressing mask, and multiplying an echo suppressing gain calculated based on the echo suppressing mask by a second transmission signal in which a transmission signal transmitted through the transmitting signal path converted into a frequency domain.

* * * * *